(12) United States Patent
Sasaki

(10) Patent No.: US 6,961,065 B2
(45) Date of Patent: Nov. 1, 2005

(54) IMAGE PROCESSOR, COMPONENTS THEREOF, AND RENDERING METHOD

(75) Inventor: Nobuo Sasaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 282 days.

(21) Appl. No.: 10/304,183

(22) Filed: Nov. 25, 2002

(65) Prior Publication Data

US 2003/0117589 A1   Jun. 26, 2003

(30) Foreign Application Priority Data

Nov. 27, 2001 (JP) .............................. 2001-361351
Nov. 21, 2002 (JP) .............................. 2002-337966

(51) Int. Cl.[7] .............................................. G09G 5/00
(52) U.S. Cl. ...................... 345/582; 345/589; 345/600; 345/601; 345/606; 345/672
(58) Field of Search ................................ 345/582, 589, 345/600, 601, 606, 672

(56) References Cited

U.S. PATENT DOCUMENTS 5,790,130 A * 8/1998 Gannett ...................... 345/587
5,856,829 A * 1/1999 Gray et al. .................. 345/422
6,320,580 B1   11/2001 Yasui et al.
6,607,098 B2 * 8/2003 Yamamoto ..................... 222/52

FOREIGN PATENT DOCUMENTS

EP   1 037 168 A2   9/2000
JP   2001-266166   9/2001

OTHER PUBLICATIONS

PCT International Search Report; in Japanese; 3 pages; (with 3-page English translation); dated Feb. 12, 2003.

* cited by examiner

Primary Examiner—Matthew C. Bella
Assistant Examiner—Mike Rahmjoo
(74) Attorney, Agent, or Firm—Fitch, Even, Tabin & Flannery

(57) ABSTRACT

To provide an image processor with which the amount of rendering can be reduced. A plurality of primitives are categorized into a first group of primitives that are to be displayed on a display and a second group of primitives that are not to be displayed thereon, by an XYZ clipping section, a Z testing section, and a stencil testing section, according to the data about the plurality of primitives in a primitive buffer. A two-dimensional image is drawn in a frame buffer using the data for the first group of primitives in the primitive buffer.

16 Claims, 18 Drawing Sheets

| PRIMITIVE NUMBER | GEOMETRY DATA |
|---|---|
| P N 1 | (x, y, z) ··· (S, T, Q) ··· (R, G, B, A) |
| P N 2 | (x, y, z) ··· (S, T, Q) ··· (R, G, B, A) |
| P N 3 | (x, y, z) ··· (S, T, Q) ··· (R, G, B, A) |
| P N 4 | (x, y, z) ··· (S, T, Q) ··· (R, G, B, A) |
| P N 5 | (x, y, z) ··· (S, T, Q) ··· (R, G, B, A) |
| P N 6 | (x, y, z) ··· (S, T, Q) ··· (R, G, B, A) |
| ⋮ | ⋮ |

| ADDRESS | VISIBLE FLAG |
|---|---|
| N A 0 | Not Active |
| N A 1 | Not Active |
| N A 2 | 1 |
| N A 3 | 1 |
| N A 4 | 0 |
| N A 5 | 1 |
| N A 6 | 1 |
| N A 7 | 1 |

IMAGE PROCESSOR, COMPONENTS THEREOF, AND RENDERING METHOD

CROSS REFERENCE TO RELATED APPLICATIONS

The present application claims priority from Japanese Application Nos. 2001-361351 filed Nov. 27, 2001 and 2002-337966 filed Nov. 21, 2002, the disclosures of which are hereby incorporated by reference herein.

BACKGROUND OF THE INVENTION

The present invention relates to an image processing technique for efficient rendering of three-dimensional images on a two-dimensional screen such as a display device.

Image processing capacities of image processors, such as game consoles or personal computers, that renders images on a display device have significantly been increased with a recent increase in processor speed.

For example, two-dimensional images that are used to display fine three-dimensional images of high quality on a two-dimensional screen can be produced in almost real time.

Two-dimensional images are produced with a plurality of primitives such as polygons that make up an image of a virtual object included in a three-dimensional image (hereinafter, referred to as an "object") and an attribute data set describing attributes of the relevant primitive, such as the shape, size, color, and brightness.

Image processing for rendering three-dimensional images on a two-dimensional screen may generally be classified into geometry processing and rendering. The geometry processing includes coordinate transformation to transform the coordinates of a set of vertices of primitives. The rendering is used to determine, for example, the color of each pixel from the geometry data obtained as a result of the geometry processing to create a two-dimensional image.

In this specification, a device that mainly performs rendering operations (including a distributed system and a semiconductor device) is referred to as a rendering processing unit. The rendering processing unit forms a portion of an image processor.

Some rendering processing units can render graphics and images, such as complicated pictures for better visual effects by rendering the same primitives two or more times. The rendering with two or more render passes is referred to as "multipass rendering". A single process in the multipass rendering is referred to as a "pass". For multipass rendering with three render passes, a polygon may be rendered without blending any texture during the first pass, a texture may be added during the second pass, and a different texture may be added during the third pass.

Conventional rendering processing units perform rendering multiple times for all primitives during the multipass rendering. This increases the number of rendering operations and, in turn, the amount of processing, when graphics or images of a complicated picture is to be rendered, resulting in a larger processing load.

The present invention is made with respect to the above-mentioned problems and an object thereof is to provide a rendering processing unit and a rendering method with which rendering operations for three-dimensional images can be achieved with less processing.

Another object of the present invention is to provide an image processor and components thereof that produce an image for better visual effects, without any overhead.

SUMMARY OF THE INVENTION

A rendering processing unit according to the present invention that solves the above-mentioned problems is a rendering processing unit for rendering three-dimensional images on a two-dimensional screen, the three-dimensional images being each made up of a plurality of primitives, comprising a primitive buffer in which a plurality of attribute data sets are written in association with relevant primitives, each attribute data set representing attributes of one of the plurality of primitives; and a tester that compares the plurality of attribute data sets in said primitive buffer with each other to categorize(sort) the plurality of primitives into a first group of primitives that are to be displayed on the two-dimensional screen and a second group of primitives that are not displayed thereon; the rendering processing unit being configured to render the first group of primitives and not to render the second group of primitives that are categorized out by said tester.

The rendering may be typical single pass rendering to render a given primitive using textures with only one render pass or multipass rendering to render the same primitive multiple times with different textures. At any rate, the primitives that are to be displayed actually on the two-dimensional screen (first group of primitives) are rendered. The throughput is significantly improved as compared with conventional rendering processing units that render all primitives making up of a three-dimensional image.

The "attribute data set" may be any kind of suitable data as long as the data can be used for determining whether a given primitive appears on the two-dimensional screen. In general, the attribute data sets may be numerical data, such as numerical data about vertices of a primitive (e.g., coordinates of a vertex, brightness of a vertex, or coordinates of a texture), the size, color, or transparency of a primitive. The numerical data about vertices may be, for example, geometry data that are obtained as a result of geometry processing.

The number of the primitives that are written in said primitive buffer may preferably be at least equal to the number of primitives with which three-dimensional images that are fit on one screen are built on the two-dimensional screen. This allows efficient rendering on screen basis.

In order to provide more efficient rendering on pixel basis, the rendering processing unit further comprises interpolation means that interpolates pixels according to a known attribute data set for a primitive. The tester categorizes the primitives on pixel basis by adding a new attribute data set obtained as a result of the interpolation of pixels into the attribute data sets to be compared with each other. With such a configuration, the primitive being displayed on the two-dimensional screen is categorized into the first group of primitives even at one pixel.

For images of higher resolutions, each pixel is divided into a predetermined number of subpixels. The interpolation means is configured to interpolate the subpixels according to a known attribute data set for a primitive when at least one of the subpixels is subjected to rendering. The tester is configured to categorize the primitives on subpixel basis by adding a new attribute data set obtained as a result of the interpolation of subpixels into the attribute data sets to be compared with each other.

The rendering processing unit may further comprise coverage calculation means that calculates a ratio of the number of subpixels that are covered by a given primitive being rendered to the total number of subpixels that make up a single pixel, and the attribute data set for the subject pixel may be determined based on the result of the calculation by said coverage calculation means. This provides faster anti-aliasing.

In order to allow for anti-aliasing, said tester may be configured not to categorize pixels on the boundary of primitives when two or more primitives are drawn at the pixel.

Each attribute data set in said primitive buffer may include position information, such as coordinate values (X, Y, and Z), that represents the position of a relative primitive in the three-dimensional images, and the tester may be configured to compare the position information included in the attribute data sets to categorize the primitives into first and second groups of primitives, the first group of primitives being primitives that are closest to the perspective of a viewer through the two-dimensional screen, the second group of primitives being other primitives than those categorized into the first group of primitives. This configuration eliminates rendering of the primitives that are hidden behind other primitive or primitives.

Each primitive may be adapted to be overlaid on stencil data comprising allowed regions that are allowed to be displayed on the two-dimensional screen and non-allowed regions that are not allowed to be displayed thereon, the stencil data representing the transparency and the shape of an image or images to be displayed. In this case, the tester categorizes the primitives into first and second groups of primitives, the first group of primitives being primitives at least a portion of which is overlaid on the allowed region or non-allowed region of the stencil data, the second group of primitives being other remaining primitives than those categorized into the first group of primitives.

From the viewpoint of increasing a rendering speed, the tester is configured to record a flag describing whether a given primitive is in the first group of primitives or in the second group of primitives, in a predetermined visible flags table that is referred to in rendering. The flag is recorded in association with the attribute data set for the given primitive. Such a configuration allows the rendering processing unit to determine whether a given attribute data set is in the first group of primitives or in the second group of primitives only by means of checking the flag in the visible flags table. The flag may be a numerical flag which has different values for each primitive, the value of the flag being updated based on the number of pixels covered by the primitive being displayed on the two-dimensional screen.

The rendering processing unit may further comprise editing means that is adapted to refer to the flag for the relevant primitive recorded in the visible flags table and to restrict the reading of the attribute data sets out of the primitive buffer for the second group of primitives. From the viewpoint of avoiding more positively the use of the second group of primitives, said editing means is adapted to delete, from said primitive buffer, the attribute data sets for the primitives that are categorized into the second group of primitives.

An image processor according to the present invention that solves the above-mentioned problems is an image processor comprising a frame buffer whose size is equal to the size of a display area in a two-dimensional screen; a first processor adapted to perform geometry processing of a plurality of primitives that describe a three-dimensional image to produce geometry data about the three-dimensional image; a second processor that renders two-dimensional images corresponding to the three-dimensional images in said frame buffer according to the produced geometry data; and a controller for use in displaying the rendered two-dimensional images in the display area.

The second processor compares a plurality of attribute data sets with each other to categorize the plurality of primitives into a first group of primitives that are to be displayed on the two-dimensional screen and a second group of primitives that are not displayed thereon and to render in said frame buffer the two-dimensional image that is made up of the first group of primitives other than the second group of primitives. Each attribute data set represents attributes of one of the plurality of primitives that are specified by the geometry data obtained from said first processor.

In a preferred embodiment, a buffer memory is provided between said first processor and said second processor and the geometry data produced by said first processor are transmitted to said second processor via the buffer memory.

The image processor may be configured by further comprising an image acceptance mechanism that accepts the three-dimensional images to be processed, from an external device, and supplies them to said first processor.

A rendering method according to the present invention that solves the above-mentioned other problems is a rendering method performed by a device for rendering three-dimensional images on a two-dimensional screen, the three-dimensional images being each made up of a plurality of primitives, the device having a primitive buffer in which the primitives are written for the formation of images. That is, this device performs a test pass and a rendering pass in this order, in which the test pass is for writing a plurality of attribute data sets in a primitive buffer in association with relevant primitives, each attribute data set representing attributes of one of the plurality of primitives that make up of the three-dimensional images, and for comparing the plurality of written attribute data sets with each other to categorize the plurality of primitives into a first group of primitives that are to be displayed on the two-dimensional screen and a second group of primitives that are not displayed thereon while the rendering pass is for reading the first group of primitives other than the second group of primitives that are categorized out in the test pass, out of the primitive buffer to render the read first group of primitives.

The rendering pass may be performed two or more times to render different textures two or more times for the same primitive.

In order to solve the above-mentioned problems, the present invention also provides a semiconductor device and a computer program.

A semiconductor device of the present invention is a semiconductor device that is mounted on a computer to which a display having a two-dimensional screen is connected, the semiconductor device being adapted to establish the following features on the computer in cooperation with other components of the computer, the features comprising a primitive buffer in which a plurality of attribute data sets are written in association with relevant primitives, each attribute data set representing attributes of one of a plurality of primitives that make up three-dimensional images; a tester that compares the plurality of attribute data sets in the primitive buffer with each other to categorize the plurality of-primitives into a first group of primitives that are to be displayed on the two-dimensional screen and a second group of primitives that are not displayed thereon; and rendering process means for rendering the first group of primitives other than the second group of primitives that are categorized out by the tester to produce a two-dimensional image to be displayed on the two-dimensional screen.

A computer program of the present invention is a computer program for use in directing a computer to perform the following tasks, the computer being connected to a primitive buffer in which primitives are written for the formation of images, and a display having a two-dimensional screen, the tasks comprising writing a plurality of attribute data sets in the primitive buffer in association with relevant primitives, each attribute data set representing attributes of one of a plurality of primitives that make up three-dimensional images; comparing the plurality of attribute data sets in the primitive buffer with each other to categorize the plurality of primitives into a first group of primitives that are to be displayed on the two-dimensional screen and a second group of primitives that are not displayed thereon; and rendering the first group of primitives other than the second group of primitives that are categorized out to produce a two-dimensional image to be displayed on the two-dimensional screen. This computer program is implemented when it is recorded in a computer-readable storage medium.

DESCRIPTION OF THE PREFERRED EMBODIMENTS

An embodiment is described in which the present invention is applied to an image processor that supports multipass rendering.

Figure 1:
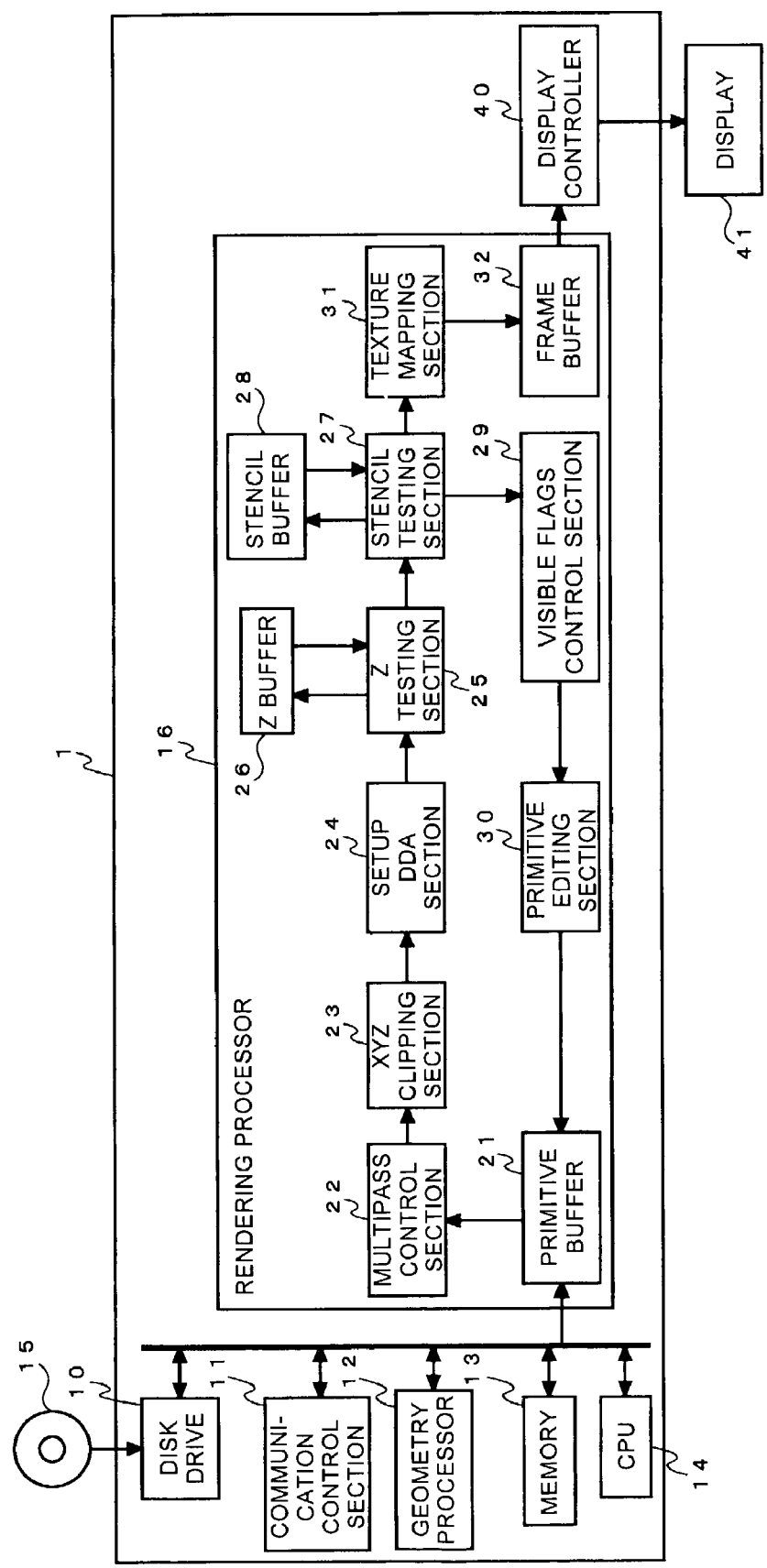
FIG. 1 shows a hardware configuration of an image processor according to an embodiment of the present invention.

FIG. 1 shows a hardware configuration of an image processor according to this embodiment.

An image processor 1 includes a rendering processor 16 which is an example of a rendering processing unit. The image processor 1 performs multipass rendering to render three-dimensional images for better visual effects on a two-dimensional screen such as a screen of a display 41 in real time. In the multipass rendering, a test pass that is described below precedes to categorize out a second group of primitives that are not to be displayed on the display 41 because of, for example, being hidden behind other primitive or primitives. A rendering pass is then performed for the primitives other than those categorized out in the test pass. Thus, the image processor 1 eliminates useless operations to render the primitives that are not to be displayed on the display 41, improving the efficiency of the rendering operations.

The image processor 1 comprises a disk drive 10 into which a disk medium 15 such as a CD-ROM or a DVD-ROM is loaded, a communication control section 11 for establishing wired or wireless communications with an external device, a geometry processor 12, a memory 13, a CPU 14 and the rendering processor 16, which are all connected to each other via a bus so that they can exchange data with each other.

A display controller 40 is connected to the rendering processor 16 to supply image signals such as video signals to the display 41.

The disk drive 10 loads data and programs for image processing from the disk medium 15 and stores them in the memory 13. The data for image processing may be, for example, figure data on primitives. The figure data in this embodiment include, for example, coordinate values of a vertex (X, Y, Z) of a primitive, brightness value of a vertex (R, G, B), a vector value, and joint information describing how the vertices are joined.

The communication control section 11 obtains, from an external device, the above-mentioned data and programs for image processing and stores them in the memory 13. In other words, the communication control section 11 obtains, from an external device, the data similar to the data that the disk drive 10 obtains from the disk medium 15 and stores them in the memory 13.

With this configuration, the image processor 1 can obtain the data and programs for image processing from at least one of the disk drive 10 and the communication control section 11.

The geometry processor 12 performs geometry processing of the figure data stored in the memory 13, such as affine transformation and vertex processing associated with a light source, under the control of the CPU 14. The geometry data obtained as a result of the geometry processing consists of data representing attributes of a given primitive, such as coordinate values of a vertex (X, Y, Z) of the primitive, texture coordinate values (S, T, Q) of each vertex, and brightness of a vertex (R, G, B, A). The symbol "A" of the brightness of a vertex is opacity that is used for known alpha-blending.

The memory 13 stores the data and programs for image processing that are obtained from at least one of the disk drive 10 and the communication control section 11. The memory 13 also stores various data that are generated during the operation of the image processor 1. Thus, the memory 13 can be used as a main memory in the image processor 1 as well.

The CPU 14 controls exchange of data between or among the components. For example, the CPU 14 controls transmission of the geometry data generated by the geometry processor 12 to the rendering processor 16 with the memory 13 used as a buffer.

In this embodiment, the geometry processor 12 is provided as a separate component from the CPU 14. However, they may be combined as a single unit so that the CPU 14 also serves as the geometry processor 12.

The rendering processor 16 performs multipass rendering based on the geometry data that are generated by the geometry processor 12.

The display controller 40 converts a two-dimensional image that is generated as a result of the rendering into an image signal that can be displayed on the display 41 and supplies it to the display 41. The image is displayed on the display 41 with this image signal.

The rendering processor 16 comprises a primitive buffer 21, a multipass control section 22, an XYZ clipping section 23, a setup DDA (Digital Differential Analyzer) section (hereinafter, referred to as an "SU/DDA section") 24, a Z testing section 25, a Z buffer 26, a stencil testing section 27, a stencil buffer 28, a visible flags control section 29, a primitive editing section 30, a texture mapping section 31, and a frame buffer 32.

The Z testing section 25, the stencil testing section 27, the visible flags control section 29, and the primitive editing section 30 are components of a tester according to the present invention.

These components may be implemented individually by using, for example, semiconductor devices. Alternatively, they may be implemented by cooperating a general-purpose digital signal processor (DSP) or a graphic processor (GP) with a computer program or programs so that the processors can load and execute the computer program(s).

The primitive buffer 21 stores the geometry data for at least one group of primitives as an example of attribute data sets for the primitives. One group of primitives may be a set of primitives that form an image on a single screen of the display 41 or a single object. Each primitive is assigned with an identification number (hereinafter, referred to as a "primitive number") as the identification information to identify the primitives. The primitive number is included in the attribute data set.

Figures 2, 3:
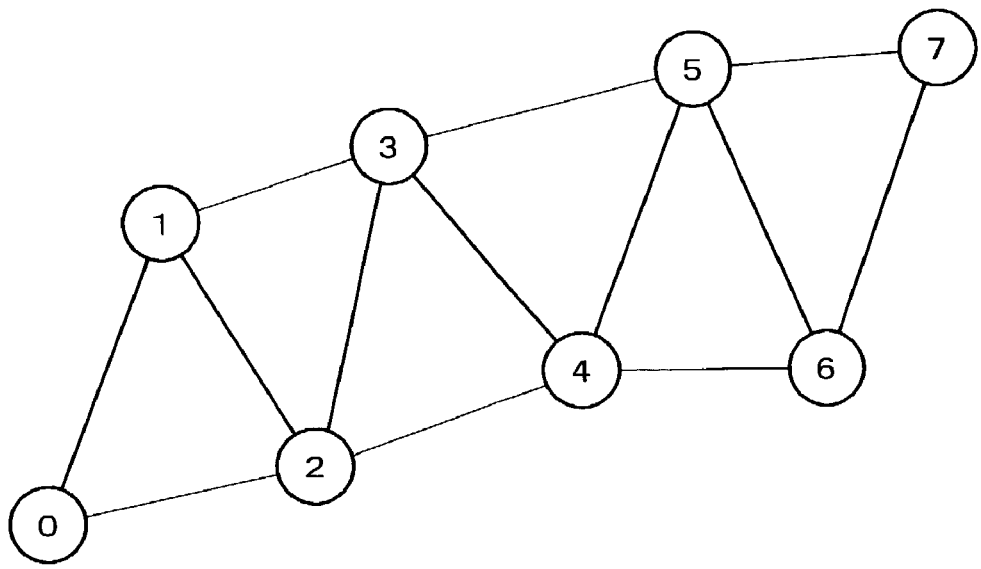
FIG. 2 is a view illustrating an example of geometry data in a primitive buffer.
FIG. 3 is a view illustrating a triangle strip.

FIG. 2 is a view illustrating the relationship between the geometry data that are stored in the primitive buffer 21 and the primitive numbers (PN1, PN2, . . . ) assigned to the geometry data. Alternatively or in addition to the illustrated example, the geometry data may be associated with flags to represent whether the given geometry data are used for multipass rendering.

When the geometry data are so-called triangle strip data to describe a triangular shape, the geometry data are generated for each vertex in the triangle strip. Therefore, the rendering processor 16 assigns a primitive number to the geometry data of each vertex and stores them in the primitive buffer 21.

FIG. 3 shows an example of a triangle strip with the triangle strip data. The numerical values "0" to "7" in the figure indicate vertices. For the triangle strip data as shown in FIG. 3, the primitive numbers are assigned to each of the vertices 0,1,2, . . . 7. A similar primitive buffer 21 may be used as well for triangle fans.

The primitive buffer 21 is provided to avoid transfer of geometry data for each pass of the multipass rendering between the geometry processor 12 and the rendering processor 16. With the primitive buffer 21, an overhead can be reduced between the geometry processor 12 and the rendering processor.

While the primitive buffer 21 in this embodiment is provided in the rendering processor 16, it may be provided independently of the rendering processor 16. Alternatively, the primitive buffer 21 may be provided in the memory 13.

The multipass control section 22 controls the multipass rendering. For example, the multipass control section 22 informs the components in the rendering processor 16 of which one of Z buffer drawing, a test pass, and a multipass rendering should be performed. The multipass control section 22 reads the geometry data of the primitives to be rendered and the primitive numbers for those geometry data out of the primitive buffer 21 and supplies them to the XYZ clipping section 23.

During the multipass rendering, the multipass control section 22 changes the geometry data when necessary. For example, in order to map different textures to one primitive (e.g., a polygon) for each pass, a scale factor of a texture coordinate value may be varied or shifted.

The multipass control section 22 also changes, when necessary, the amount of shifting coordinates of an origin of the texture. This change allows the rendering processor 16 to perform linear transformation for each texture coordinate axis. Furthermore, the multipass control section 22 selectively converts, when necessary, brightness values of a vertex (R, G, B, A) into a fixed value. This eliminates a loss of re-transmitting the same brightness values of a vertex in the rendering processor 16 during, for example, the second pass or later.

The XYZ clipping section 23 performs three-dimensional clipping of a primitive with the geometry data that are supplied from the multipass control section 22, based on clip data that are previously provided. The clip data describe a display area in the display 41. Clipping is to cut the part of a primitive or primitives that falls outside of the display area defined by the clip data or to change the shape a primitive or primitives a part of which falls outside of the display area.

Figure 4:
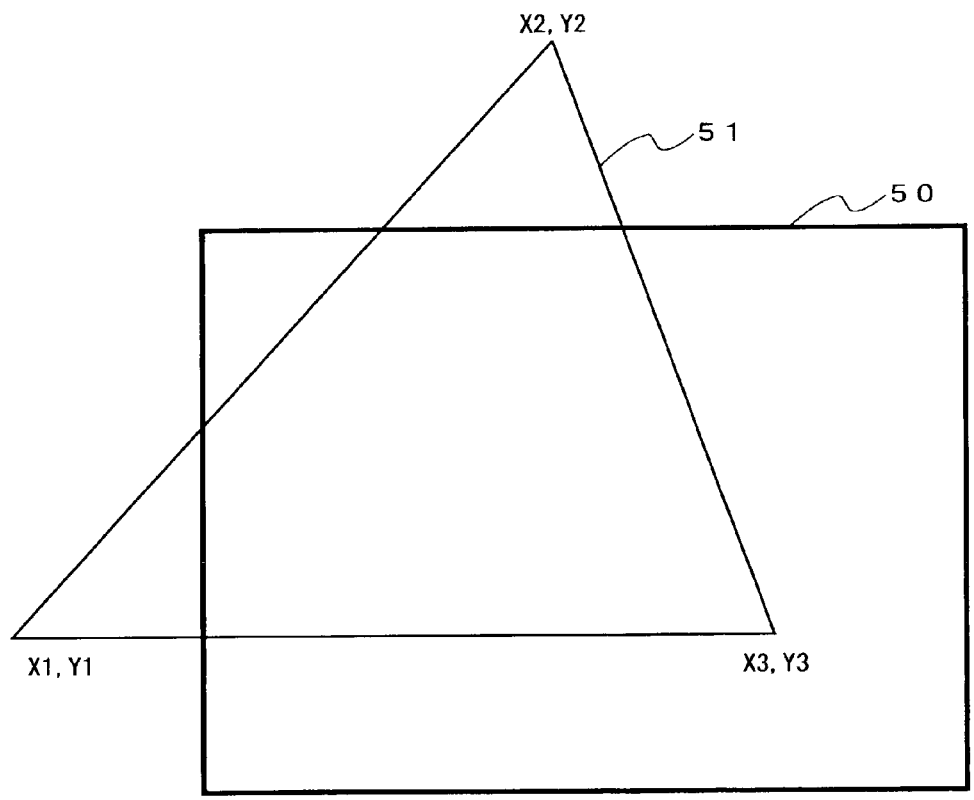
FIG. 4 is a view that is used to describe clipping.
Figure 5:
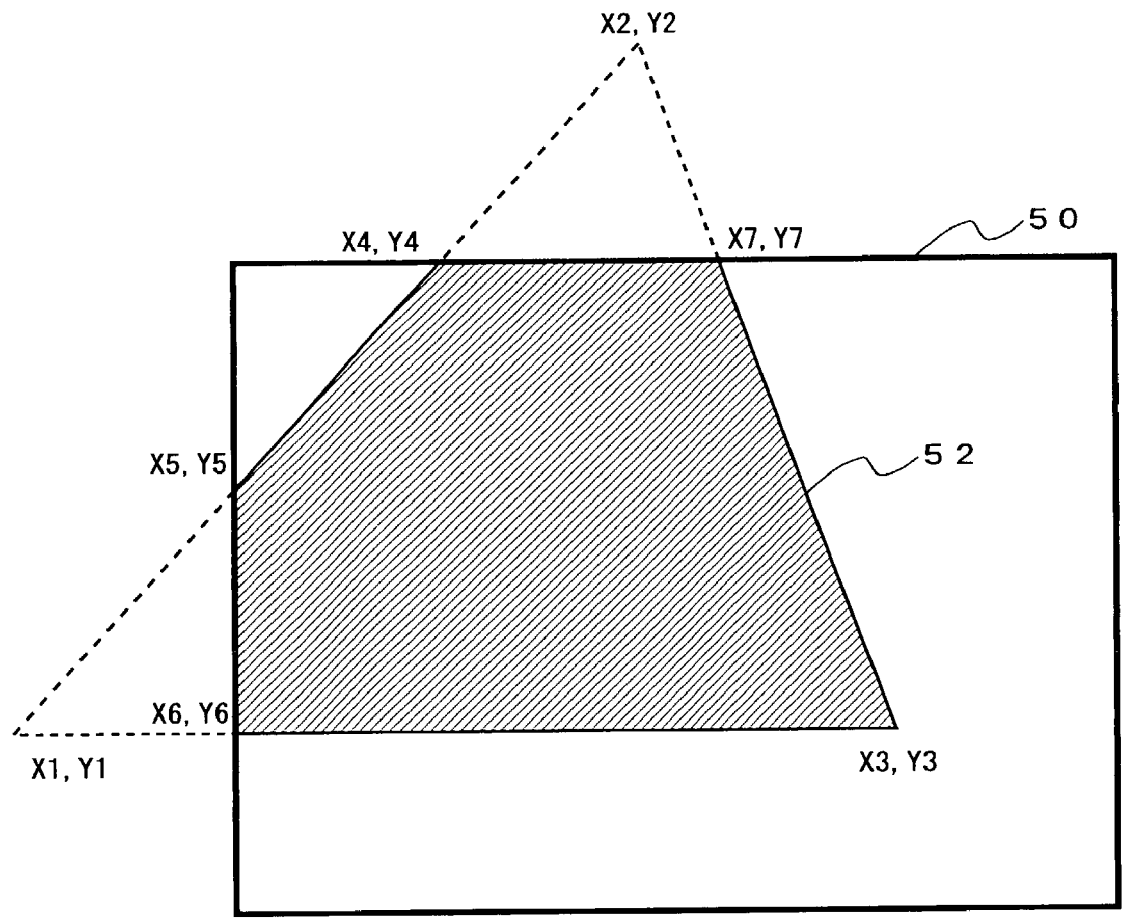
FIG. 5 is a view that is used to describe clipping.

Now, clipping operations are described more specifically with reference to FIGS. 4 and 5.

FIG. 4 shows the relationship between a primitive 51 described by coordinates of vertices (X1,Y1), (X2,Y2), and (X3,Y3) and a display area 50 in the display 41. The XYZ clipping section 23 changes the shape of the primitive 51 by means of clipping when a part of it falls outside of the display area 50. FIG. 5 shows the relationship between a primitive 52 having a modified shape and the display area 50.

The XYZ clipping section 23 changes the shape of the primitive 51 a part of which falls outside of the display area 50, as shown in FIG. 5. The XYZ clipping section 23 then generates the new primitive 52 defined by coordinates of vertices (X3,Y3), (X6,Y6), (X5,Y5), (X4,Y4), and (X7,Y7). The primitive number of the new primitive 52 is the same as the one assigned to the primitive 51 before the change in shape.

The XYZ clipping section 23 supplies the geometry data and the primitive number after the clipping to the SU/DDA section 24.

The SU/DDA section 24 performs setup and DDA operations.

The setup operation is for calculating initial coordinate values and a slope value that are used for the DDA operation, according to the geometry data after the clipping that are supplied from the XYZ clipping section 23.

The DDA operation is for linear interpolation between the vertices of the primitive and interpolation inside the primitive to obtain interpolation data including coordinate values (X, Y, Z) of pixels forming a primitive, brightness values (R, G, B, A), and texture coordinate value (S, T, Q) for texture mapping, according to the initial coordinate values and the slope value that are calculated in the setup operation.

For the case of the primitive 52 shown in FIG. 5 for example, the interpolation data are obtained for each pixel in the hatched portion. In the Z buffer drawing and the test pass that are described below, the SU/DDA section 24 may interpolate only the coordinate values of the pixels.

The interpolation data for each pixel are supplied to the Z testing section 25 along with the primitive number.

The Z testing section 25 performs different operations for the Z buffer drawing and for the test pass.

For the Z buffer drawing, the Z testing section 25 compares on pixel basis the Z value that is included in the interpolation data that are supplied from the SU/DDA section 24 and the Z value that is stored in the Z buffer 26. The Z testing section 25 then writes either one of the Z values into the Z buffer 26 according to the result of the comparison. For example, it selects the Z value that is closer to the point of view and writes this Z value into the Z buffer 26. When the Z value that is supplied from the SU/DDA section 24 is selected, this Z value is used to update the Z value of the relevant pixel in the Z buffer 26. When the Z value that is stored in the Z buffer 26 is selected, the Z buffer 26 is not updated.

However, with a Z buffer for one pixel, other primitive or primitives necessary for display may be present in the background of a primitive that does not cover the entire pixel area. With this respect, for anti-aliasing, the Z testing section 25 does not write the Z value of this pixel into the Z buffer 26. When a primitive is transparent or translucent, no Z value is written in the Z buffer 26 for similar reasons.

On the other hand, for the test pass, the Z testing section 25 compares on pixel basis the Z value that is stored in the Z buffer 26 and the interpolation data supplied from the SU/DDA section 24 to choose the interpolation data with the same Z value as the one that is stored in the Z buffer 26. The Z testing section 25 then supplies the selected interpolation data to the stencil testing section 27 along with the primitive number. As described above, when the Z buffer 26 has no Z value stored therein, the Z testing section 25 chooses the interpolation data with the Z value that is closest to the point of view and supplies them to the stencil testing section 27 along with the primitive number.

The Z value of the primitive that is closest to the point of view is written into the Z buffer 26 for each pixel as a result of the Z buffer drawing.

The rendering pass may be performed on subpixel basis rather than on pixel basis to render images of higher resolution. In such a case, a Z buffer for subpixels is used. Images are then reduced in size to obtain actual pixels after the completion of rendering of the subpixels.

Figure 6:
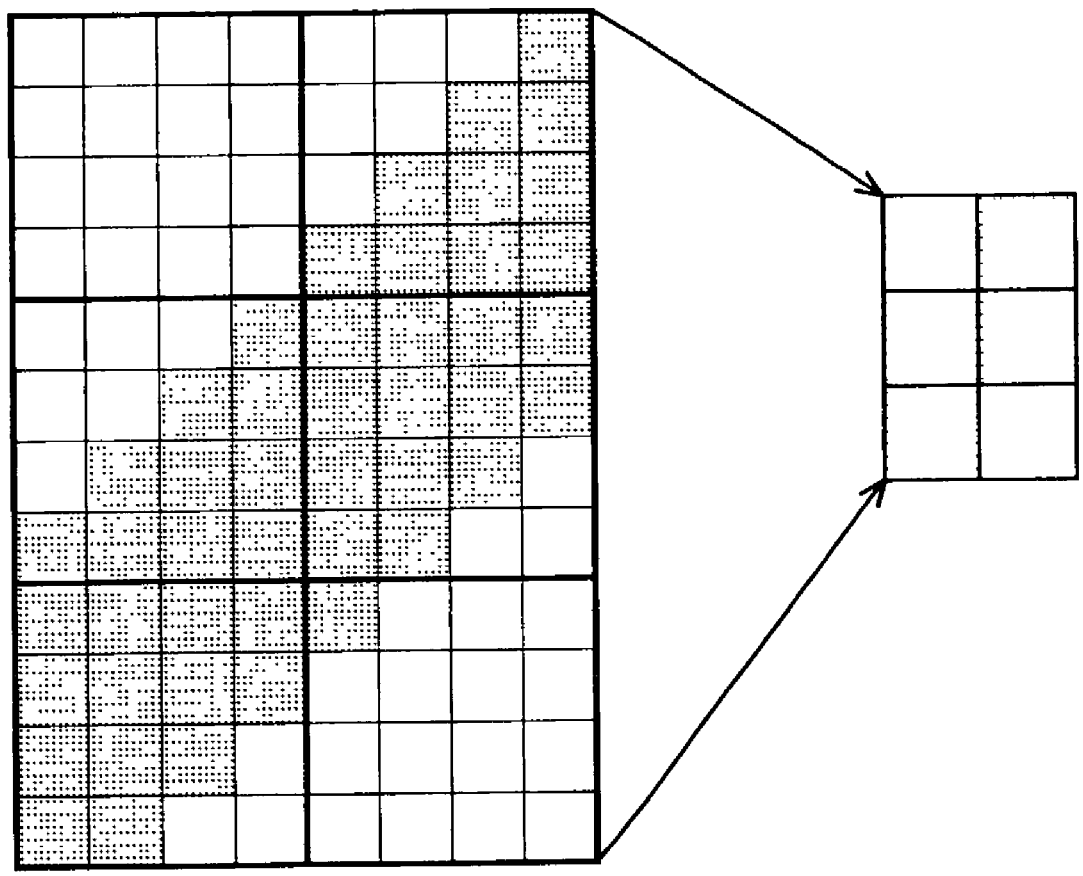
FIG. 6 is a view illustrating subpixels.

FIG. 6 shows an example in which a matrix of 3 by 2 pixels is described using subpixels. In FIG. 6, each pixel is divided into 4 by 4 subpixels. In this example, upward-sloping lines are drawn. The pixel at the lower right is determined as a pixel over which no hatch is drawn when typical pixels are used. However, a hatch is drawn over one subpixel when the subpixels are used. The hatch thus affects on the pixel at the lower right. In this way, by writing the Z values on subpixel basis, even when one pixel includes two or more primitives, display can be made while taking all primitives into consideration.

With the Z buffer 26 having a plenty of storage space, the primitive numbers assigned to the primitives of the Z values may be stored in addition to the Z values.

The stencil testing section 27 performs stencil testing according to the stencil data that are stored in the stencil buffer 28.

An outline of the stencil testing is described with reference to FIG. 7.

Figure 7:
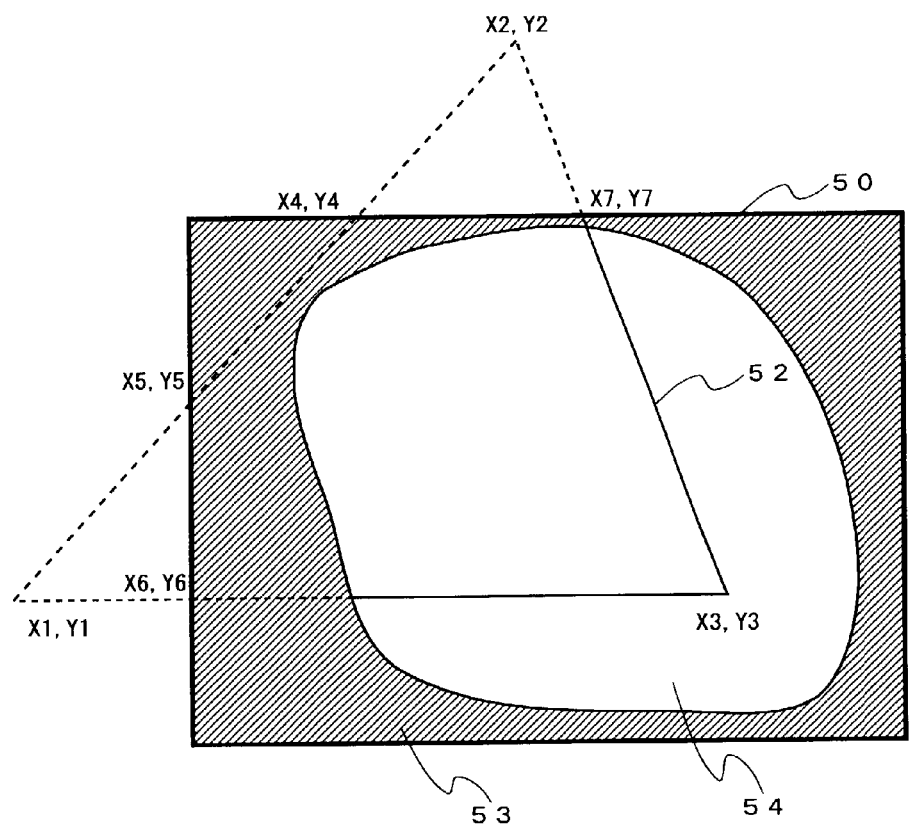
FIG. 7 is a view that is used to describe a stencil test.

As shown in FIG. 7, the stencil data represent a non-allowed region 53 that is not allowed to be displayed on the display 41 and an allowed region 54 that is allowed to be displayed thereon. The stencil testing according to this embodiment is for comparing, for example, coordinate values of the interpolation data that are supplied from the Z testing section 25 and coordinate values of the stencil data to determine whether the primitive 52 is displayed in the allowed region 54, that is, whether there are interpolation data within the allowed region 54. The primitive number of the primitive 52 to be displayed is supplied to the visible flags control section 29.

For the multipass rendering, the interpolation data of the primitive to be displayed are supplied to the texture mapping section 31.

The stencil buffer 28 is configured to store the stencil data and read them out when requested from the stencil testing section 27. The stencil data that are stored in the stencil buffer 28 are supplied from, for example, the memory 13 via a bus.

The primitives are grouped into those including pixels to be displayed on the display 41 and those not to be displayed thereon, by means of the XYZ clipping section 23, the Z testing section 25 and the stencil testing section 27.

The primitive number of the primitive including the pixels to be displayed on the display 41 is supplied from the stencil testing section 27 to the visible flags control section 29.

Figure 8:
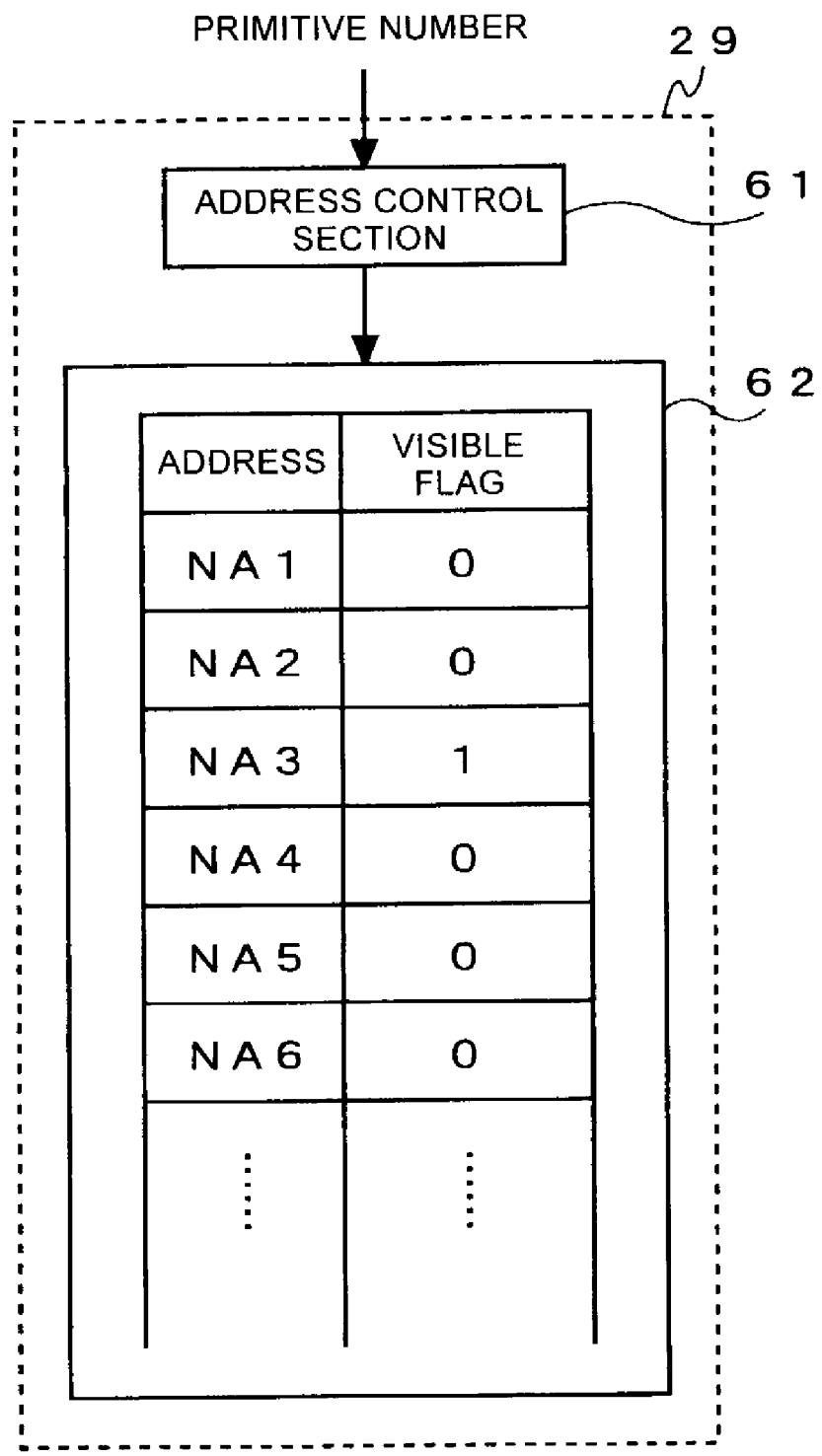
FIG. 8 is an exemplified configuration of-a visible flags control section.

The visible flags control section 29 comprises, as shown in FIG. 8, an address control section 61 and a visible flags table 62.

The visible flags table 62 stores visible flags to indicate whether it is displayed on the display 41 to the addresses (NA1, NA2, . . . ) according to the primitive.

The addresses correspond to primitive numbers (PN1, PN2, . . . ) that are assigned to the primitive data stored in the primitive buffer 21.

The address control section 61 initializes the visible flags table 62, calculates addresses of the visible flags table 62, and changes visible flags. For example, the address control section 61 clears the visible flag into "0" when the Z buffer drawing is completed for all primitives (initialization). The address control section 61 then converts the primitive numbers supplied from the stencil testing section 27 into the addresses of the visible flags table 62 and changes the visible flags corresponding to those addresses from "0" to "1".

The addresses of the visible flag at which the value of "1" is stored correspond to the primitive numbers of the primitives to be displayed on the display 41. In addition, the addresses of the visible flag at which the value of "0" is contained correspond to the primitive numbers of the primitives having no pixel to be displayed on the display 41.

The addresses may be the same as the above-mentioned primitive numbers.

Figures 9, 10:
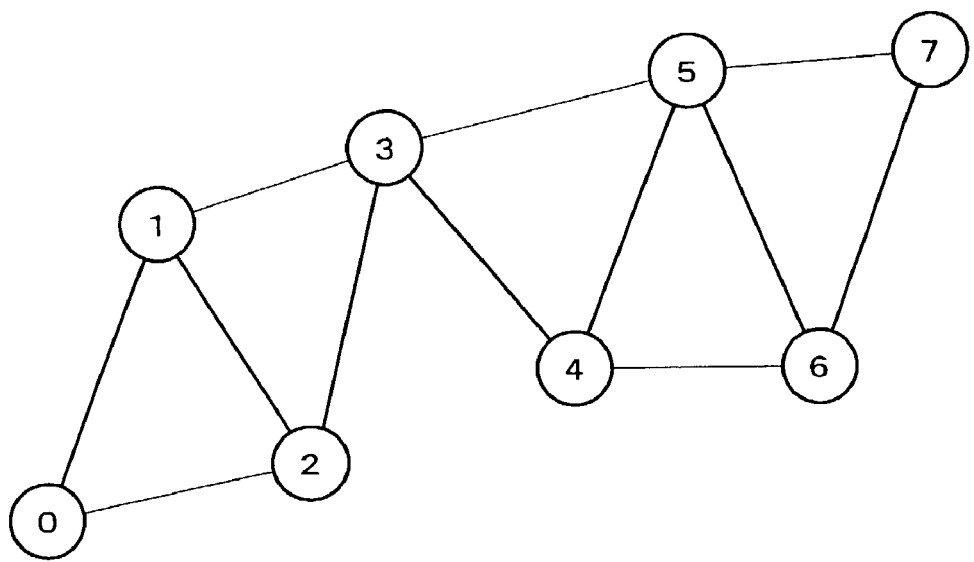
FIG. 9 is a view illustrating a triangle strip.
FIG. 10 is a view illustrating a visible flags table when the primitive is a triangle strip.

When the primitive is a triangle strip as shown in FIG. 9, the visible flags table 62 is as shown in FIG. 10. In the illustrated example in FIG. 9, no primitive is formed for the triangle defined by the vertices 2, 3, and 4.

More specifically, visible flags are stored indicating whether the display is made, at the addresses corresponding to the primitive numbers of the vertices 0,1,2, . . . 7. For the triangle strip, the geometry data for the vertices are read out in the order from 0 to form triangle primitives. For example, after the geometry data for the vertices 0 and 1 are read out, the geometry data for the vertex 2 are read. This forms a triangle primitive defined by the vertices 0 and 1 and 2. The visible flags for the vertices 0 and 1 are "Not Active", and the vertices 0 and 1 are not affected by the visible flags.

In the example shown in FIG. 10, the vertex 4 having the primitive number 4 corresponding to the address NA4 is not displayed. This means that no triangle is formed with the vertices 2, 3, and 4 at the time when the geometry data of the vertex 4 are read out during rendering. It does not mean that no triangle is formed that is associated with the vertex 4. In other words, a triangle with the vertices 2, 3, and 4 is not formed but a triangle with the vertices 3, 4, and 5, and a triangle with the vertices 4, 5, and 6 are formed. Similar visible flags table 62 may be used as well for triangle fans.

The visible flag may be a single value or a binary value, or it may be an integer. The address control section 61 in this event successively converts the primitive numbers of the pixels that are supplied from the stencil testing section 27 into an address of the visible flags table 62 and increments successively the value of the visible flag corresponding to the relating address. Consequently, the visible flag has a value based on the number of the pixels to be displayed on the display 41 for every primitive.

Writing to the visible flags table 62 by the visible flags control section 29 is made by the size of several bits. Page breaking is caused less frequently as compared with writing in the frame buffer 32. Therefore, the test pass can be made at a higher speed.

The primitive editing section 30 is an example of the editing means of the present invention. The primitive editing means 30 checks the primitive number of the primitive that is not to be displayed on the display 41, according to the visible flags table 62 of the visible flags control section 29. Then, it ensures that the geometry data corresponding to the identified primitive number are not read out of the primitive buffer 21.

For example, the primitive editing section 30 checks the primitive number corresponding to the address where the visible flag of the visible flags table 62 indicates "0". The primitive editing section 30 ensures that the primitive corresponding to this primitive number is not read out of the primitive buffer 21 during the multipass rendering. When the geometry data in the primitive buffer 21 are assigned with flags indicating whether the data are used for the multipass rendering, this flag is used to prevent the primitive from being read out during the multipass rendering. The geometry data may be deleted from the primitive buffer 21.

The texture mapping section 31 performs rendering by the number of cycles corresponding to the number of passes. The texture mapping section 31 maps, for example, different textures to the same primitive for each pass. This mapping renders the image to be displayed in the frame buffer 32.

The frame buffer 32 comprises a memory space for the display 41. Pixels are drawn on the memory space in such a manner that the pixels fill in the two-dimensional plane in the display 41. The images drawn in the frame buffer 32 in frame units are supplied to the display 41 and displayed thereon as image signals through the display controller 40.

Next, operation of the image processor 1 having the above-mentioned configuration, in particular, a rendering method achieved by the rendering processor 16 is described specifically.

It is assumed that the geometry data that are the results of the geometry processing performed by the geometry processor 12 are stored in the primitive buffer 21 in the rendering processor 16 as an example of the attribute data set.

Figure 11:
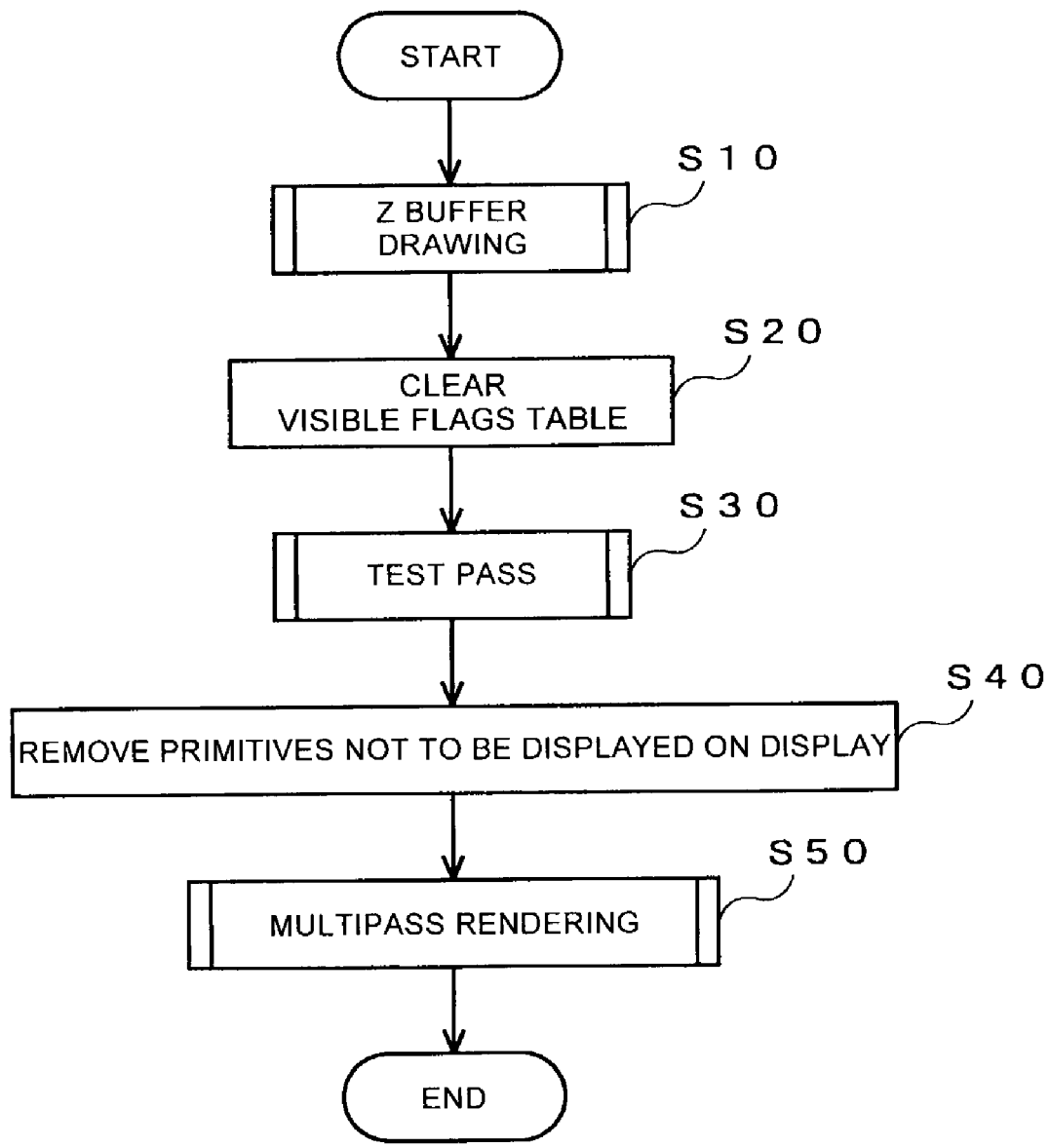
FIG. 11 is a view illustrating a rendering procedure according to an embodiment of the present invention.

FIG. 11 is a schematic view illustrating this rendering method.

The rendering processor 16 performs the Z buffer drawing for all geometry data that are stored in the primitive buffer 21, and writes the Z value(s) close to the point of view in the Z buffer (step S10). After the completion of the Z buffer drawing, the rendering processor 16 clears the visible flags table 62 of the visible flags control section 29 to set all visible flags to "0" (step S20). Then, the test pass is performed and the visible flag in the visible flags table 62 is changed based on the result of the test pass (step S30). During the test pass, the visible flags table 62 is supplied with the flags indicating that the primitives are those to be displayed on the display 41 or those not to be displayed thereon. The rendering processor 16 checks the visible flags table 62 and deletes the geometry data of the primitives that are not to be displayed on the display 41 from the geometry data stored in the primitive buffer 21. In other words, the relevant primitives are deleted (step S40). After the deletion of the primitives, the rendering processor 16 performs multipass rendering for the primitives that are to be displayed on the display 41 (step S50).

In this way, the rendering can be made without any losses.

Next, the processing steps in FIG. 11 are described more specifically.

[Z Buffer Drawing: Step S10]

Figure 12:
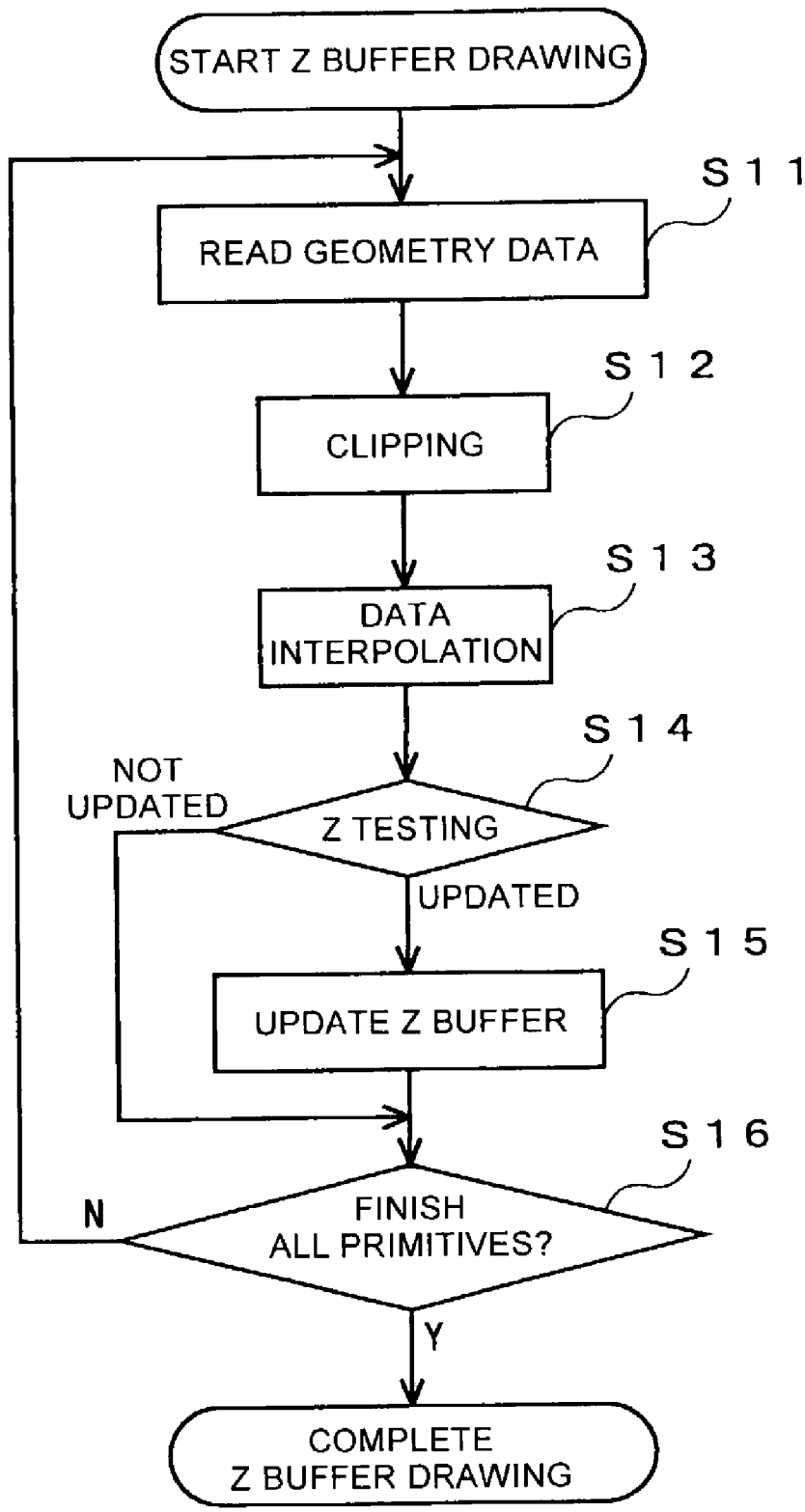
FIG. 12 is a view illustrating a Z buffer drawing procedure.
Figure 13:
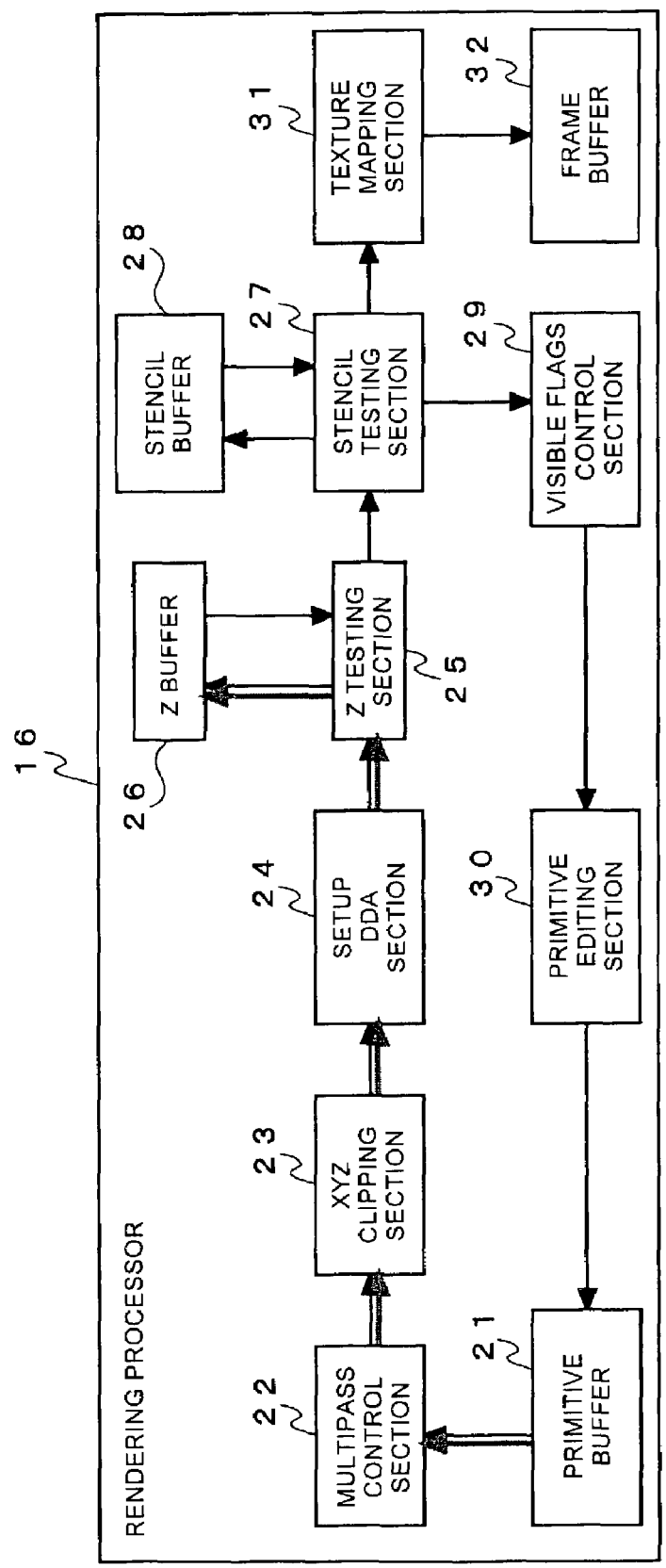
FIG. 13 is a view illustrating a data flow for the Z buffer drawing.

FIG. 12 shows procedures during the Z buffer drawing while FIG. 13 shows a data flow therefor.

During the Z buffer drawing, the multipass control section 22 reads the geometry data along with the primitive number from the primitive buffer and supplies them to the XYZ clipping section 23 (step S11). The XYZ clipping section 23 performs clipping of the primitives according to the primitive data that are supplied from the multipass control section 22. The XYZ clipping section 23 cuts or reshapes the part of the primitives that falls outside of the display area 50 of the display 41. The results of the cut or reshape operations are reflected to the geometry data (step S12). The geometry data after clipping are supplied to the SU/DDA section 24 along with the primitive number. The geometry data for the part of the primitives removed during the clipping are not supplied to the SU/DDA section 24.

The SU/DDA section 24 performs interpolation according to the geometry data after clipping to create coordinate values of the pixels that forms the primitive (step S13). The SU/DDA section 24 supplies the generated coordinate values to the Z testing section 25 as interpolation data along with the primitive number.

The Z testing section 25 performs the Z testing using the interpolation data for the pixels that are supplied from the SU/DDA section 24 (step S14). The Z testing section 25 reads the Z value of the relevant pixel from the Z buffer 26. The Z testing section 25 then compares with the Z value and the Z value included in the interpolation data to choose the one that is closer to the point of view. The Z buffer 26 is kept unchanged when the Z value that is read from the Z buffer 26 is closer to the point of view (step S14: not updated) while the Z value of the Z buffer 26 is updated when the Z value that is included in the interpolation data is closer to the point of view (step S14: updated, step S15).

The above-mentioned sequences of operations are done for all geometry data that are stored in the primitive buffer 21 (step S16). This completes the Z buffer drawing.

After the completion of the Z buffer drawing, the Z buffer 26 contains the Z value of the primitive that is the closest to the point of view for each pixel. It is noted that the Z value is not written in the pixel when the primitive does not fill in the entire pixel area or when the primitive is transparent or translucent.

[Test Pass: Step S30]

Figure 14:
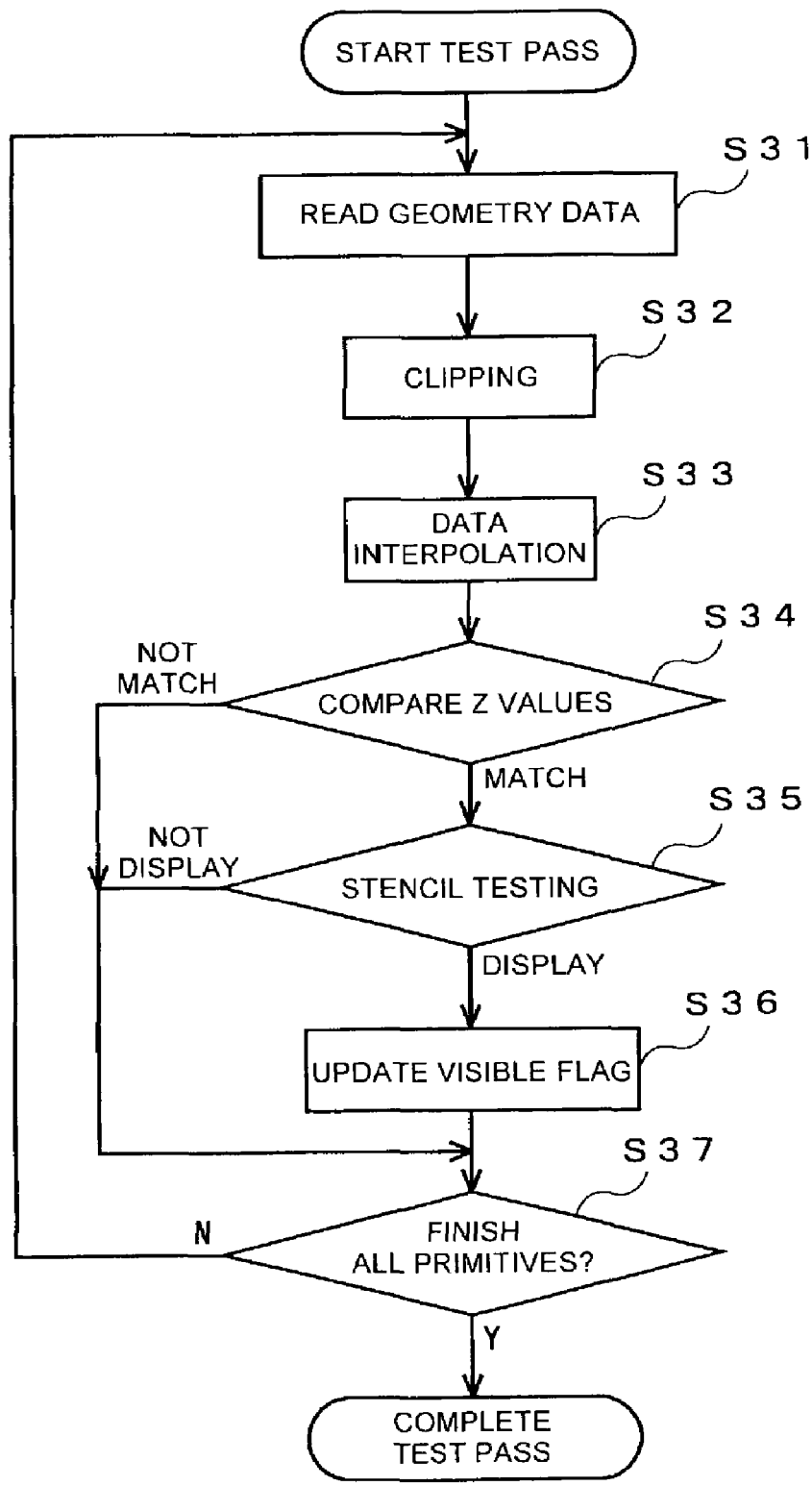
FIG. 14 is a view illustrating a processing procedure for a test pass.
Figure 15:
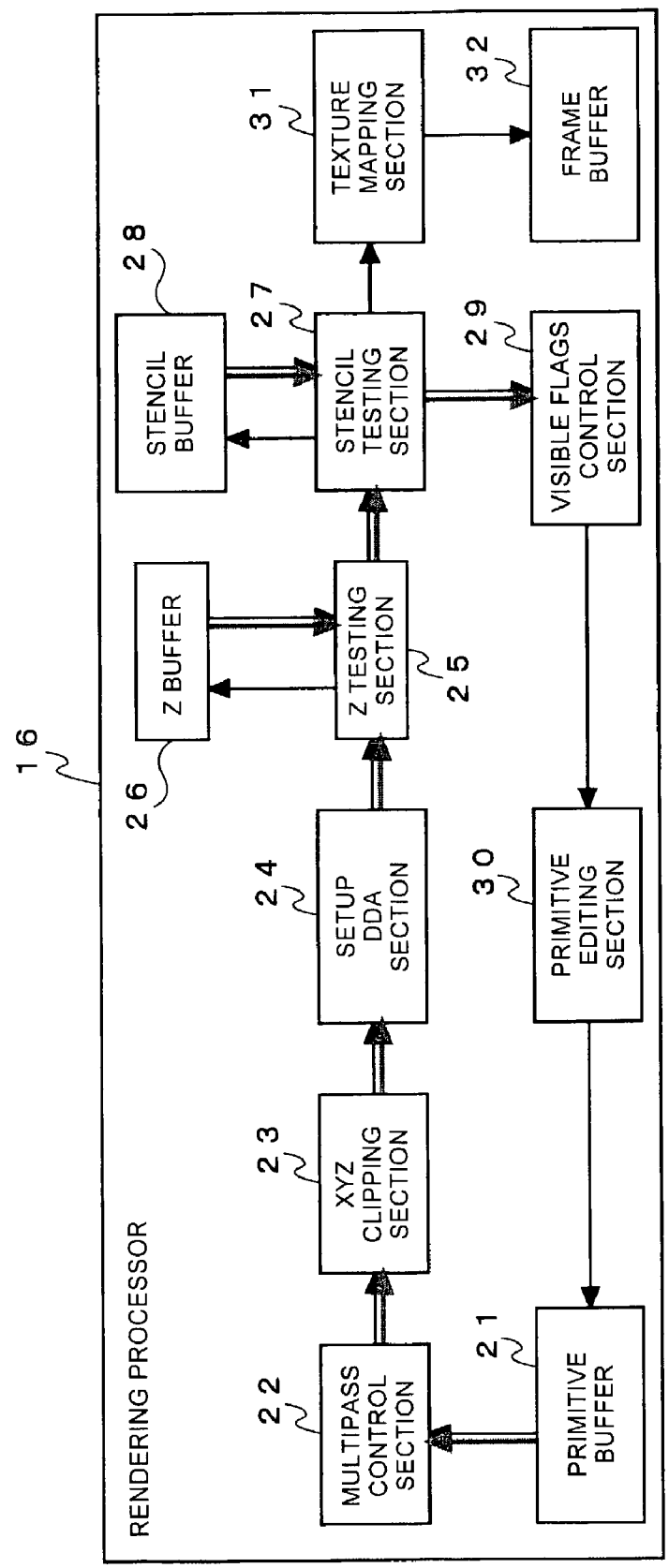
FIG. 15 is a view illustrating a data flow for the test pass.

FIGS. 14 and 15 are views that are used to describe operations during the test pass. For the test pass, the multipass control section 22 reads the geometry data along with the primitive number out of the primitive buffer and supplies them to the XYZ clipping section 23 (step S31). The XYZ clipping section 23 clips the primitives according to the geometry data that are supplied from the multipass control section 22 to cut or reshape the part of the primitive that falls outside of the display area of the display 41 (step S32). The XYZ clipping section 23 then reflects the results of the cut or reshape operations to the geometry data. The clipping geometry data are supplied to the SU/DDA section 24 along with the primitive number. The geometry data for the part of the primitive that is cut by the clipping are not supplied to the SU/DDA section 24.

The SU/DDA section 24 performs interpolation according to the geometry data after clipping to create coordinate values of the pixels that form the primitive (step S33). The SU/DDA section 24 supplies the generated coordinate values to the Z testing section 25 as the interpolation data along with the primitive number.

The Z testing section 25 performs operations for the test pass. In the operations for the test pass, the Z testing section 25 compares the Z value that is included in the interpolation data supplied from the SU/DDA section 24 with the Z value that is stored in the Z buffer 26. The Z testing section 25 supplies the interpolation data and the primitive number to the stencil testing section 27 for those matching with each other (step S34: match). When the values do not match, the rendering processor 16 determines whether the test pass is completed for all geometry data that are stored in the primitive buffer 21 (step S34: not match, step S37).

For the pixels of which Z value is not stored in the Z buffer 26, the interpolation data and the primitive number having the Z value that is the closest to the point of view are supplied to the stencil testing section 27.

The stencil testing section 27 performs stencil testing on the interpolation data that are supplied from the Z testing section 25 (step S35). As a result of the stencil testing, when the pixel indicated by the interpolation data is located in the allowed region 54, this pixel is to be displayed. Accordingly, the primitive number is supplied to the visible flags control section 29 (step S35; displayed). When the pixel indicated by the interpolation data is in the non-allowed region 53, the rendering processor 16 determines whether the test pass is completed for all geometry data stored in the primitive buffer 21 (step S35: not displayed, step S37).

The visible flags control section 29 updates the visible flag at the address corresponding to the primitive number to "1" in response to the primitive number supplied from the stencil testing section 27 (step S36).

The above-mentioned operations are done for all geometry data stored in the primitive buffer 21 (step S37). This completes the test pass.

The Z buffer drawing and the test pass are used to categorize out the primitives that are not to be displayed on the display 41. More specifically, the XYZ clipping section 23 clips and separates the part of the primitive that falls outside the display area 50. The Z testing section 25 categorizes out by the Z testing the primitives that are hidden behind other primitive or primitives. The stencil testing section 27 categorize out by the stencil testing the primitive in the non-allowed region 53.

The visible flags have the value "0" at the addresses in the visible flags control section 29 corresponding to the primitive numbers of the primitives that are categorized out as described above. This primitive is not displayed on the display 41.

In other words, the XYZ clipping section 23, the Z testing section 25, and the stencil testing section 27 serve to categorize (sort) the primitives into the primitives that are to be displayed on the display 41 and the primitives that are not to be displayed thereon. The visible flags in the visible flags control section 29 are set to "1" only for the primitives that are to be displayed thereon. The visible flag remains to be "0" for the primitives that are determined as the one not to be displayed, by at least one of the XYZ clipping section 23, the Z testing section 25, and the stencil testing section 27.

The illustrated Z testing is performed with a different pass from the test pass. However, the Z testing may be performed with the same pass when the Z buffer 26 has a plenty of storage space. In such a case, for the Z testing, the Z value and the primitive number of that Z value are written in the Z buffer 26 to identify the primitive that is the closest to the point of view. As a result of the Z testing, it is possible to categorize the primitives using the primitive numbers stored in the Z buffer 26. The Z buffer drawing and the test pass can be performed with a single pass.

In this embodiment, the visible flag of the visible flags table 62 is set to "0" at the step S30 to perform the test pass. However, this step may be eliminated. In such a case, the Z buffer drawing and the test pass are used to categorize the primitives into those to be displayed on the display 41 and those not to be displayed thereon and to set the visible flag to "0" or "1".

Alternatively, each of the XYZ clipping section 22, the Z testing section 25, and the stencil testing section 27 may transmit categorize number of the primitives that are determined not to be displayed on the display 41 to the visible flags control section 29.

[Primitive Deletion: Step S40]

Figure 16:
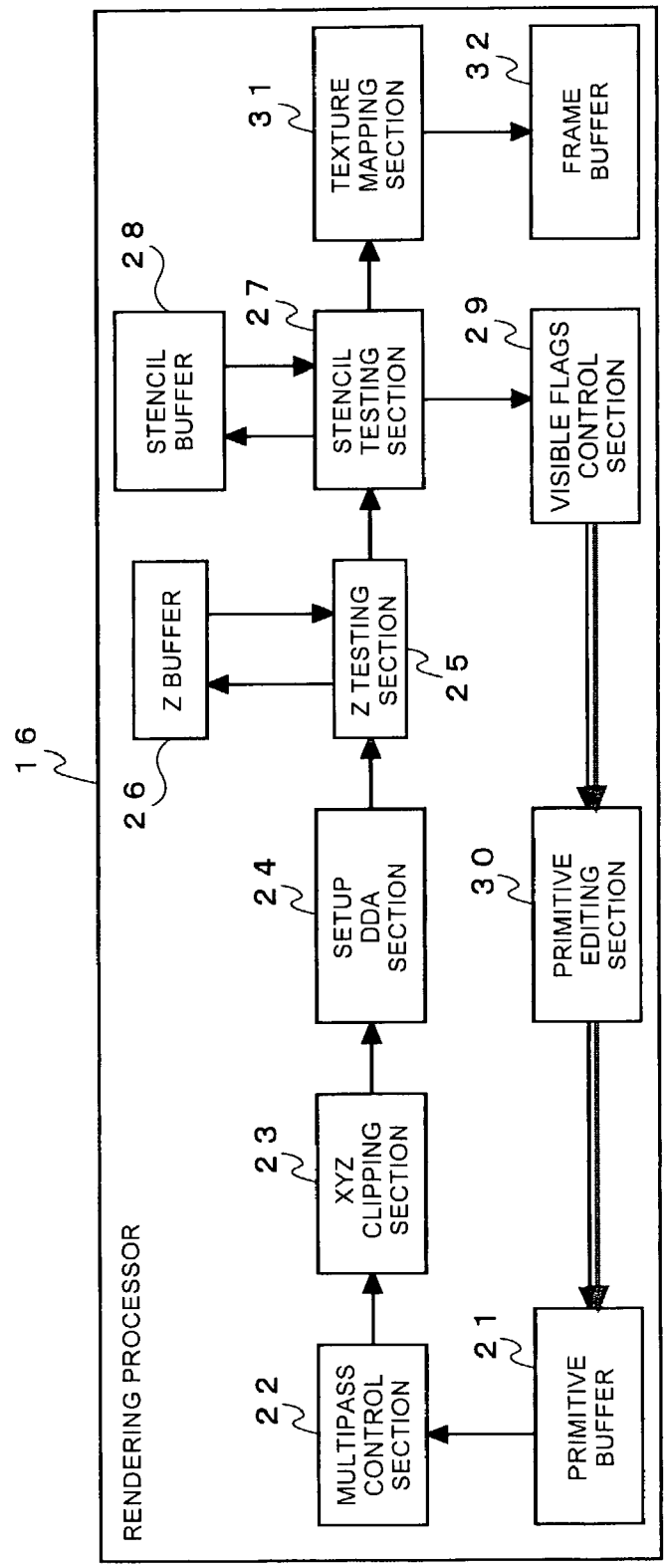
FIG. 16 is a view illustrating a data from when primitives that are not to be displayed on a display are deleted.

The rendering processor 16 prevents the geometry data of the primitives that are not to be displayed on the display 41 of the geometry data that are stored in the primitive buffer 21 from being read out in the multipass rendering, according to the visible flags table 62 of the visible flags control section 29 (step S40). FIG. 16 is a view that is used to describe operations performed by the rendering processor 16 in deleting the primitives.

The primitive editing section 30 checks the primitives that are to be displayed on the display 41 and the primitives that are not to be displayed thereon, using the visible flags of the visible flags table 62 of the visible flags control section 29. For example, in the visible flags table 62 in FIG. 8, the primitives with the primitive number corresponding to the address at which the visible flag is set to "0" are the primitives that are not to be displayed. The primitives with the primitive number corresponding to the address at which the visible flag is set to "1" are the primitives that are to be displayed.

The primitive editing section 30 deletes the geometry data of the primitives that are determined not to be displayed, from the primitive buffer 21.

This ensures that only the geometry data for those to be displayed on the display 41 are processed during the multipass rendering, reducing the load to the rendering processor associated with the multipass rendering.

For example, with a triangle strip, the geometry data cannot be deleted because all geometry data are used. Accordingly, flags may be added to all geometry data to indicate whether they are used for the multipass rendering. These flags are used to identify the primitives that are not to be displayed on the display 41. Of course, such flags may be used for those other than the triangle strip without deleting the geometry data.

[Multipass Rendering: Step S50]

Figure 17:
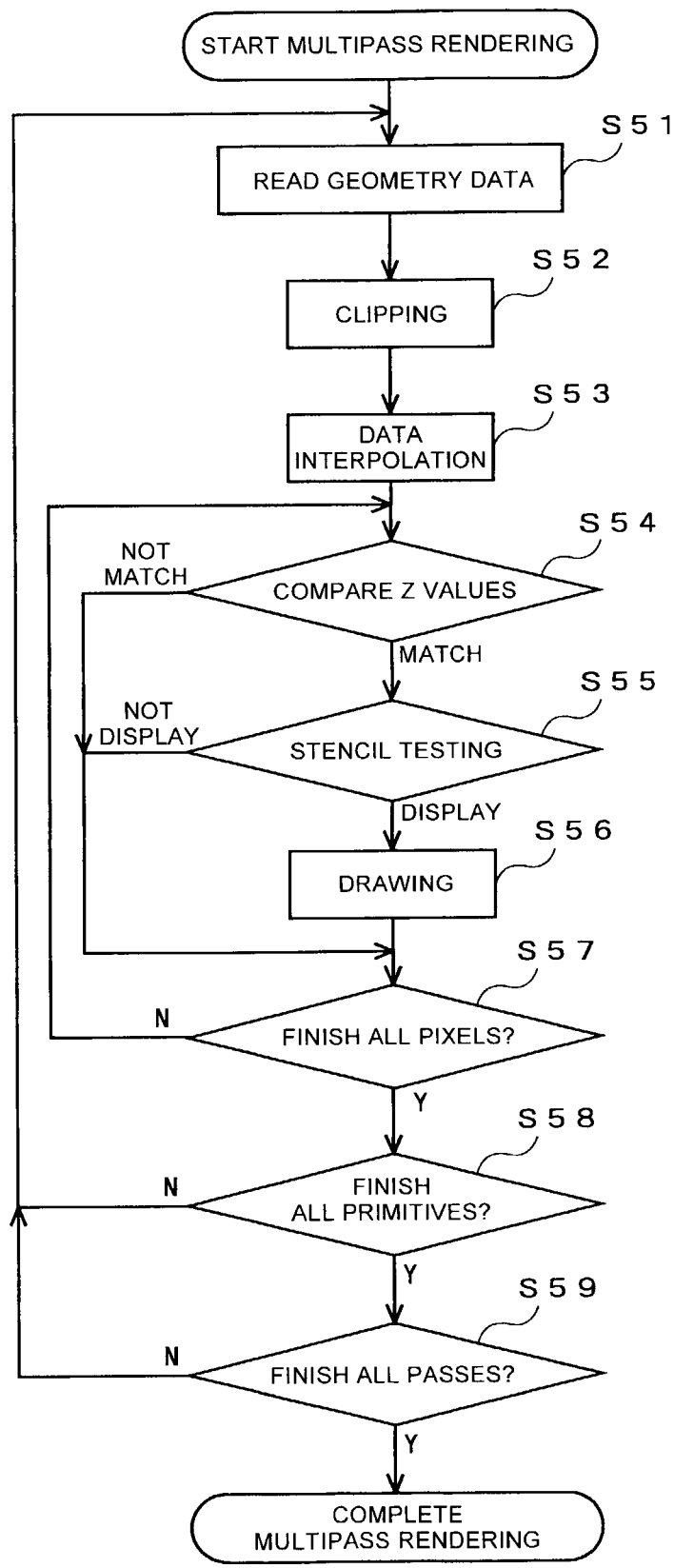
FIG. 17 is a view illustrating a multipass rendering procedure.
Figure 18:
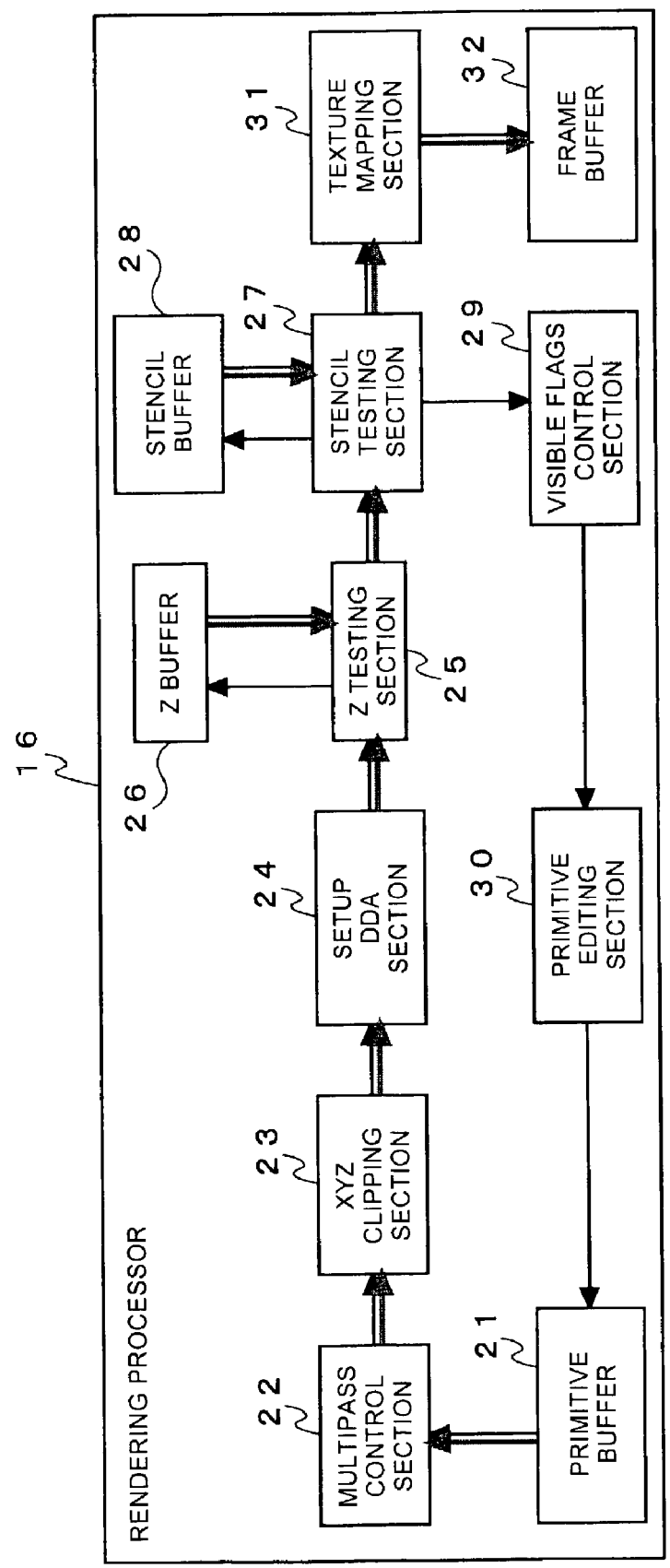
FIG. 18 is a view illustrating a data flow for the multipass rendering.

FIGS. 17 and 18 are views that are used to describe operations for the multipass rendering.

For the multipass rendering, the multipass control section 22 reads the geometry data along with the primitive number out of the primitive buffer and supplies them to the XYZ clipping section 23 (step S51).

The XYZ clipping section 23 clips the primitives according to the geometry data supplied from the multipass control section 22 to cut or reshape the part of the primitive that falls outside of the display area of the display 41 (step S52). The XYZ clipping section 23 reflects the results of the cut or reshape operations to the geometry data. The clipping geometry data are supplied to the SU/DDA section 24 along with the primitive number.

Performs interpolation according to the geometry data after clipping to create interpolation data including coordinate values of the pixels that form the primitive, brightness values and texture coordinate values (step S53). The SU/DDA section 24 supplies the generated interpolation data to the Z testing section 25 along with the primitive number.

The Z testing section 25 compares, on pixel basis, the Z value that is included in the interpolation data supplied from the SU/DDA section 24 with the Z value that is stored in the Z buffer 26. The Z testing section 25 supplies the interpolation data and the primitive number to the stencil testing section 27 for those matching with each other (step S54: match). When the values do not match, the operation goes to step S57.

For the pixels of which Z value is not stored in the Z buffer 26, the interpolation data and the primitive number having the Z value that is the closest to the point of view are supplied to the stencil testing section 27.

The stencil testing section 27 performs stencil testing on the interpolation data that are supplied from the Z testing section 25 (step S55). As a result of the stencil testing, when the pixel indicated by the interpolation data is located in the allowed region 54, this pixel is to be displayed. Accordingly, the interpolation data are transmitted to the texture mapping section 31 (step S55: displayed). When the pixel indicated by the interpolation data is in the non-allowed region 53, the operation goes to the step S57.

The texture mapping section 31 draws a primitive in the frame buffer 32 according to the interpolation data supplied from the stencil testing section 27 (step S56). This completes the drawing for one primitive.

The rendering processor 16 performs the operations at the steps S54 to S56 until the drawing is completed for all pixels forming the relevant primitive (step S57).

After completion of the drawing of one primitive, it is determined whether the drawing of other primitives is finished (step S58). If there remains a primitive of which drawing is not finished, the operation goes back to the step S51 (step S58: N). When the drawing is completed for all primitives (step S58: Y), it is determined whether the drawing is done with the predetermined number of passes (step S59). If the predetermined number of the passes is not reached, the operation goes back to the step S51 (step S59: N). If the predetermined passes are done for all primitives, the multipass rendering is terminated (step S59: Y).

As a result of the above-mentioned operations, the two-dimensional images to be displayed on the display 41 are drawn in the frame buffer 32 (see FIG. 1). Then, the display controller 40 converts the two-dimensional images drawn in the frame buffer 32 into an image signal and transmits the signal to the display 41. The display 41 displays the image signal.

As apparent from the above, according to the image processor 1 of this embodiment, the geometry data that are read out of the primitive buffer 21 in the multipass rendering are limited to the minimum required, reducing the load associated with the rendering.

Figure 19:
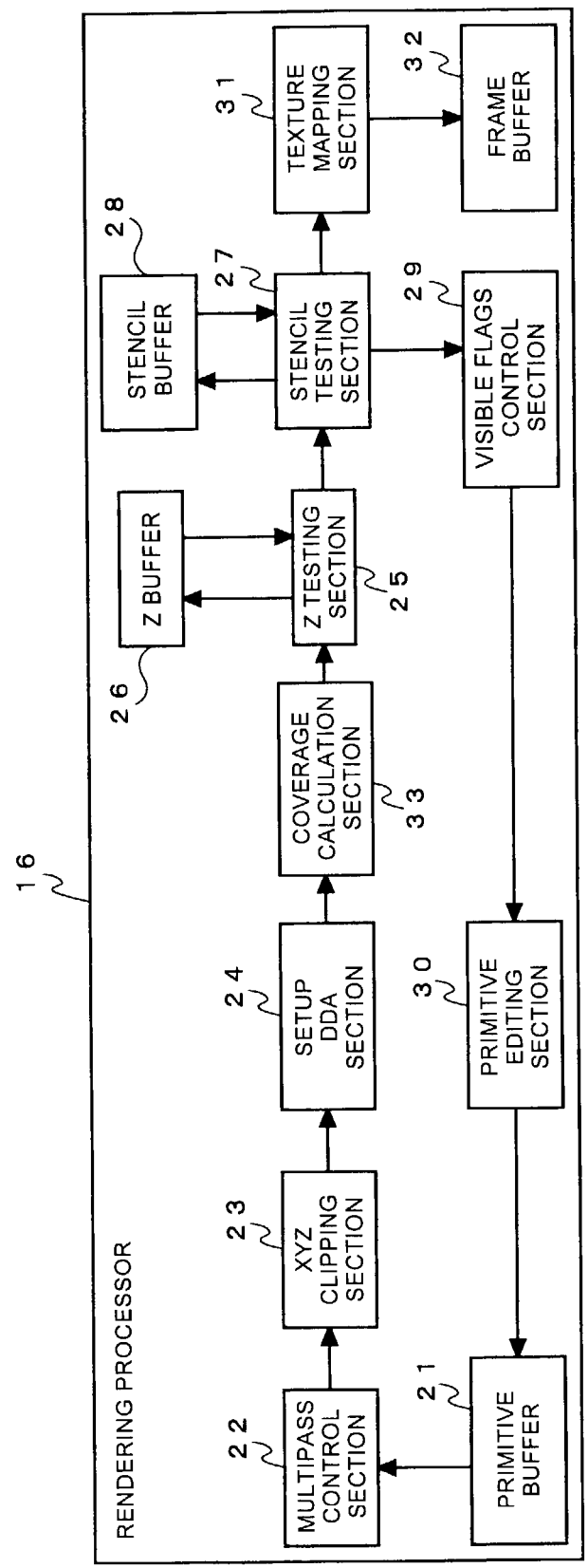
FIG. 19 shows a hardware configuration of a rendering processor according to another embodiment of the present invention.

Alternatively, the rendering processor 16 may have a configuration as shown in FIG. 19.

The rendering processor 16 in FIG. 19 is different from the rendering processor in FIG. 1 in that a coverage calculation section 33 is provided ahead of the Z testing section 25.

Figure 20:
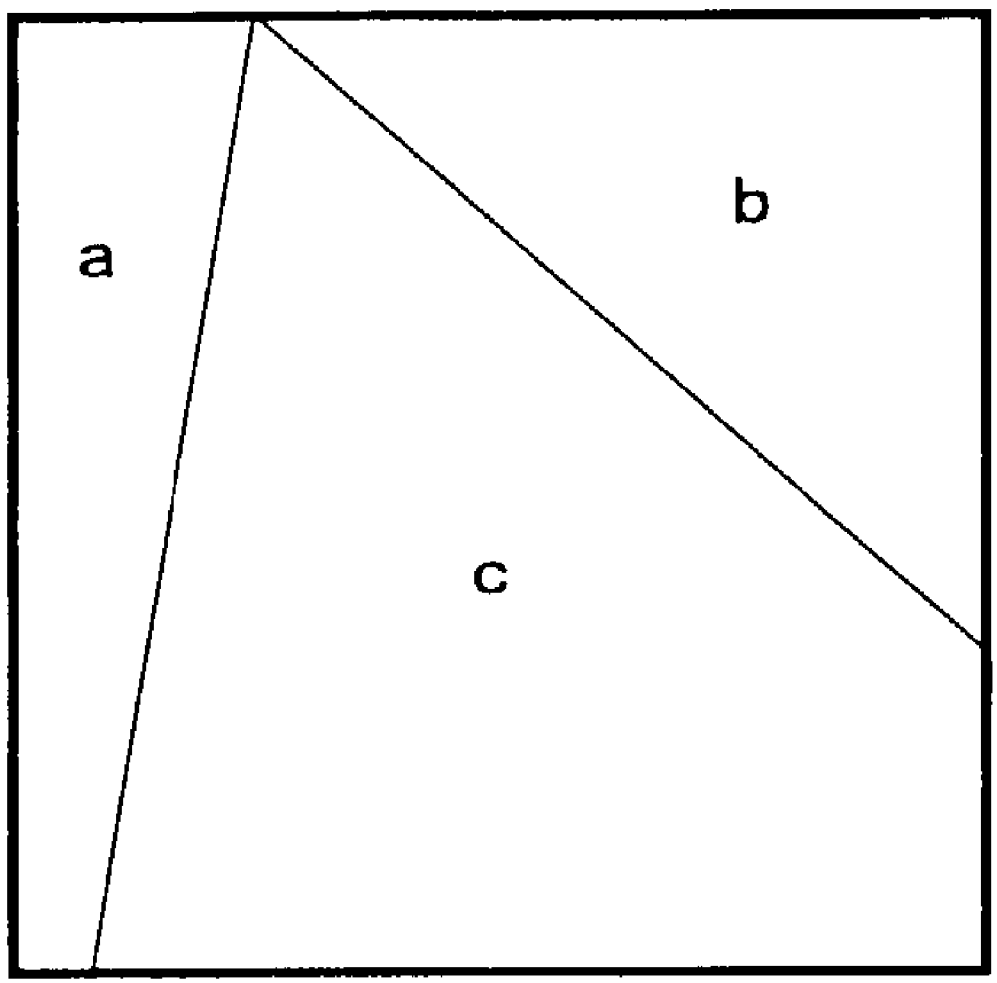
FIG. 20 is a view that is used to describe primitive coverage.

The coverage calculation section 33 is for calculating a ratio (coverage) of the number of subpixels that are covered by a given primitive being rendered to the total number of subpixels that make up a single pixel. The coverage may be obtained using, for example, a device and a method that are disclosed in Japanese Patent Laid-Open No. 2002-140722 ("Apparatus and method for rendering antialiased image, corresponding to U.S. Patent Laid Open No. 2002/101435A1). FIG. 20 is a view that is used to describe the coverage of the primitives in one pixel. In FIG. 20, three primitives a, b, and c cover one pixel. The coverage of these primitives in one pixel is 2:3:7 for the primitives a, b, and c.

The rendering processor 18 blends the primitives a, b, and c according to the ratio to obtain a representative primitive of this pixel.

Since the primitives a, b, and c are rendered for the pixel, the Z buffer 26 is prevented from being updated by the primitives a, b, and c for this pixel. The rendering processor 16 having the above-mentioned features effectively reduces jaggies. Thus, this method also can be used for anti-aliasing purposes.

With the method in which the coverage is calculated for every one pixel, the Z buffer is done only in the region where the coverage is equal to 1 (opaque or within the primitive). The Z buffer is not done for the boundaries where the coverage is less than 1. Taking this into consideration, Z sorting (sorting of Z values) is performed regardless of the fact that the Z buffer is used, in order to eliminate artificiality of boundaries. The values are written in the frame buffer 32 in order of distance from the farthest to the nearest. In this event, the primitives that are hidden behind other primitive or primitives are removed.

While the present invention has thus been described in conjunction with the case of multipass rendering, the test pass may be performed for typical rendering that renders a given primitive using textures with only one pass to render only the primitives that are to be displayed on the display 41.

As apparent from the above, according to the present invention, the amount of operations to be done can be reduced significantly in the rendering, in particular the multipass rendering, as compared with conventional methods.

What is claimed is:

1. A rendering processing unit for rendering three-dimensional images on a two-dimensional screen, the three-dimensional images being each made up of a plurality of primitives, comprising:
a primitive buffer in which a plurality of attribute data sets are written in association with relevant primitives, each attribute data set representing attributes of one of the plurality of primitives; and
a tester that compares the plurality of attribute data sets in said primitive buffer with each other to categorize the plurality of primitives into a first group of primitives that are to be displayed on the two dimensional screen and a second group of primitives that are not displayed thereon,
wherein each primitive is adapted to be overlaid on stencil data comprising allowed regions that are allowed to be displayed on the two-dimensional screen arid non-allowed regions that are not allowed to be displayed thereon, the stencil data representing the transparency and the shape of an image or images to be displayed,
at least a portion of the first group of primitives being overlaid on the allowed region or non-allowed region of the stencil data, the second group of primitives being other remaining primitives than those categorized into the first group of primitives, and
the rendering processing unit being configured to render the first group of primitives and not to render the second group of primitives that are categorized out by said tester.

2. The rendering processing unit as claimed in claim 1, wherein the number of the primitives that are written in said primitive buffer is at least equal to the number of primitives with which three-dimensional images that are fit on one screen are built on the two dimensional screen.

3. The rendering processing unit as claimed in claim 1, further comprising interpolation means that interpolates pixels according to a known attribute data set for a primitive,
said tester categorizing the primitives on pixel basis by adding a new attribute data set obtained as a result of the interpolation of pixels into the attribute data sets to be compared with each other.

4. The rendering processing unit as claimed in claim 3, wherein each pixel is divided into a predetermined number of subpixels,
said interpolation means interpolating the subpixels according to a known attribute data set for a primitive when at least one of the subpixels is subjected to rendering,
said tester categorizing the primitives on subpixel basis by adding a new attribute data set obtained as a result of the interpolation of subpixels into the attribute data sets to be compared with each other.

5. The rendering processing unit as claimed in claim 4, further comprising coverage calculation means that calculates a ratio of the number of subpixels that are covered by a given primitive being rendered to the total number of subpixels that make up a single pixel, the attribute data set for the subject pixel being determined based on the result of the calculation by said coverage calculation means.

6. The rendering processing unit as claimed in claim 1, wherein said tester does not categorize pixels on the boundary of primitives when two or more primitives are drawn at the pixel.

7. The rendering processing unit as claimed in claim 1, wherein each attribute data set in said primitive buffer includes position information that represents the position of a relative primitive in the three-dimensional images, and
said tester compares the position information included in the attribute data sets to categorize the primitives into first and second groups of primitives, the first group of primitives being primitives that are closest to the perspective of a viewer through the two-dimensional screen, the second group of primitives being other primitives than those categorized into the first group of primitives.

8. The rendering processing unit as claimed in claim 1, wherein said tester records a flag describing whether a given primitive is in the first group of primitives or in the second group of primitives, in a predetermined visible flags table that is referred to in rendering, the flag being recorded in association with the attribute data set for the given primitive.

9. The rendering processing unit as claimed in claim 8, wherein the flag is a numerical flag which has different values for each primitive, the value of the flag being updated based on the number of pixels covered by the primitive being displayed on the two-dimensional screen.

10. A rendering processing unit for rendering three-dimensional images on a two-dimensional screen, the three-dimensional images being each made up of a plurality of primitives, comprising:
a primitive buffer in which a plurality of attribute data sets are written in association with relevant primitives, each attribute data set representing attributes of one of the plurality of primitives;
a tester that compares the plurality of attribute data sets in said primitive buffer with each other to categorize the plurality of primitives into a first group of primitives that are to be displayed on the two-dimensional screen and a second group of primitives that are not displayed thereon, wherein said tester records a flag describing whether a given primitive is in the first group of primitives or in the second group of primitives, in a predetermined visible flags table that is referred to in rendering, the flag being recorded in association with the attribute data set for the given primitive; and
editing means that is adapted to refer to the flag for the relevant primitive recorded in the visible flags table and to restrict the reading of the attribute data sets out of the primitive buffer for the second group of primitives;
the rendering processing unit being configured to render the first group of primitives and not to render the second group of primitives that are categorized out by said tester.

11. The rendering processing unit as claimed in claim 10, wherein said editing means is adapted to delete, from said primitive buffer, the attribute data sets for the primitives that are categorized into the second group of primitives.

12. A rendering method comprising a test pass and a rendering pass that are performed in this order by a device for rendering three-dimensional images on a two-dimensional screen, the three-dimensional images being each made up of a plurality of primitives, the device having a primitive buffer in which the primitives are written for the formation of images,
the test pass being for writing a plurality of attribute data sets in a primitive buffer in association with relevant primitives, each attribute data set representing attributes of one of the plurality of primitives that make up of the three-dimensional images, and for comparing the plurality of written attribute data sets with each other to categorize the plurality of primitives into a first group of primitives that are to be displayed on the two-dimensional screen and a second group of primitives that are not displayed thereon, wherein each primitive is adapted to be overlaid on stencil data comprising allowed regions that are allowed to be displayed on the two-dimensional screen and non-allowed regions that are not allowed to be displayed thereon, the stencil data representing the transparency and the shape of an image or images to be displayed, at least a portion of the first group of primitives being overlaid on the allowed region or non-allowed region of the stencil data, and the second group of primitives being other remaining primitives than those categorized into the first group of primitives, and the rendering pass being for reading the first group of primitives other than the second group of primitives that are categorized out in the test pass, out of the primitive buffer to render the read first group of primitives.

13. The rendering method as claimed in claim 12, wherein the device performs two or more cycles of the rendering pass to render different textures two or more times for the same primitive.

14. A semiconductor device that is mounted on a computer to which a display having a two-dimensional screen is connected, the semiconductor device being adapted to establish the following features on the computer in cooperation with other components of the computer, the features comprising:

a primitive buffer in which a plurality of attribute data sets are written in association with relevant primitives, each attribute data set representing attributes of one of a plurality of primitives that make up three-dimensional images;

a tester that compares the plurality of attribute data sets in the primitive buffer with each other to categorize the plurality of primitives into a first group of primitives that are to be displayed on the two-dimensional screen and a second group of primitives that are not displayed thereon, wherein said tester records a flag describing whether a given primitive is in the first group of primitives or in the second group of primitives, in a predetermined visible flags table that is referred to in rendering, the flag being recorded in association with the attribute data set for the given primitive; and editing means that is adapted to refer to the flag for the relevant primitive recorded in the visible flags table and to restrict the reading of the attribute data sets out of the primitive buffer for the second group of primitives;

rendering process means for rendering the first group of primitives other than the second group of primitives that are categorized out by the tester to produce a two-dimensional image to be displayed on the two-dimensional screen.

15. A computer program for use in directing a computer to perform the following tasks, the computer being connected to a primitive buffer in which primitives are written for the formation of images, and a display having a two-dimensional screen, the tasks comprising:

writing a plurality of attribute data sets in the primitive buffer in association with relevant primitives, each attribute data set representing attributes of one of a plurality of primitives that make up three-dimensional images;

comparing the plurality of attribute data sets in the primitive buffer with each other to categorize the plurality of primitives into a first group of primitives that are to be displayed on the two-dimensional screen and a second group of primitives that are not displayed thereon;

adapting each primitive to be overlaid on stencil data comprising allowed regions that are allowed to be displayed on the two-dimensional screen and non-allowed regions that are not allowed to be displayed thereon, the stencil data representing the transparency and the shape of an image or images to be displayed;

overlaying at least a portion of the first group of primitives on the allowed region or non-allowed region of the stencil data, the second group of primitives being other remaining primitives than those categorized into the first group of primitives; and rendering the first group of primitives other than the second group of primitives that are categorized out to produce a two-dimensional image to be displayed on the two-dimensional screen.

16. A computer-readable storage medium in which a computer program as claimed in claim 15 is stored.

* * * * *